United States Patent
Antognini et al.

(10) Patent No.: US 8,468,148 B2
(45) Date of Patent: Jun. 18, 2013

(54) SEARCHING BY USE OF MACHINE-READABLE CODE CONTENT

(76) Inventors: Walter Gerard Antognini, New York, NY (US); Thomas Charles Antognini, Lexington, MA (US)

(*) Notice: Subject to any disclaimer, the term of this patent is extended or adjusted under 35 U.S.C. 154(b) by 1403 days.

(21) Appl. No.: 11/981,773

(22) Filed: Oct. 31, 2007

(65) Prior Publication Data

US 2009/0112815 A1    Apr. 30, 2009

(51) Int. Cl.
*G06F 17/30* (2006.01)
(52) U.S. Cl.
CPC .......................... *G06F 17/30873* (2013.01)
USPC ............................ 707/712; 382/287; 235/454
(58) Field of Classification Search
CPC .................................................. G06F 17/30873
USPC ......... 707/802, 712, 770; 235/454; 358/408; 382/132, 182, 287, 312
See application file for complete search history.

(56) References Cited

U.S. PATENT DOCUMENTS

| | | | | |
|---|---|---|---|---|
| 5,402,171 A * | 3/1995 | Tagami et al. | ............ | 348/219.1 |
| 5,822,083 A * | 10/1998 | Ito et al. | ................. | 358/403 |
| 6,098,882 A * | 8/2000 | Antognini et al. | ............ | 235/454 |
| 6,176,427 B1 * | 1/2001 | Antognini et al. | ............ | 235/454 |
| 6,820,807 B1 * | 11/2004 | Antognini et al. | ............ | 235/454 |
| 6,826,313 B2 * | 11/2004 | Robar et al. | ................ | 382/287 |
| 6,874,420 B2 * | 4/2005 | Lewis et al. | ................ | 101/485 |
| 7,672,513 B2 * | 3/2010 | Bjorklund et al. | ............ | 382/188 |
| 2003/0048466 A1 * | 3/2003 | Yamada et al. | ............ | 358/1.12 |
| 2004/0249835 A1 * | 12/2004 | Langeveld et al. | ............ | 707/802 |
| 2006/0126916 A1 * | 6/2006 | Kokumai | ............ | 382/151 |
| 2006/0239505 A1 * | 10/2006 | Bjorklund et al. | ............ | 382/103 |

\* cited by examiner

*Primary Examiner* — Shahid Alam

(57) ABSTRACT

A method of searching the Internet or onboard database or other source through devices that contain or are coupled to cameras or other imaging devices, the method including extracting search terms from the human-understandable content encoded in a machine-readable code and displayed to the recipient on the device following the imaging of that code by the device's imager. The method of search utilizes a method of navigation and input that produces a location indicator on the device display that corresponds to the location of an image of a machine-readable code in the sensor of the device's imager.

6 Claims, 7 Drawing Sheets

SEARCHING BY USE OF MACHINE-READABLE CODE CONTENT

BACKGROUND OF THE INVENTION

This invention relates to methods for searching online (such as through the Internet) or offline for information of interest to a user of a device, particularly devices such as camera cell phones and PDAs (personal digital assistants). Current methods proposed for searching the Internet typically involve the searcher manually inputting search terms or having machine-readable codes provide a simple URL or a paucity of pre-determined search terms or providing a search based on an image of a logo, etc.

These possibilities are quite limited on a number of counts. The user—the one who actually wants the search—must either manually input search terms, a cumbersome task on mobile devices, or resign themselves to a predetermined search (i.e., the search is essentially shaped by someone else, not the person who actually wants the search). Furthermore, these current proposals would only provide information to the user by going off to the Internet to find that information. This requirement imposes an unwanted time lag and can provide information only if the device is then capable of establishing an online connection, an oftentimes questionable assumption depending on coverage in the user's particular location at that time. The invention overcomes these and other problems.

The invention generally relates to a method where human-understandable information such as text, graphics, audio and video is digitally encoded into a barcode or other machine-readable code, and that machine-readable code is printed or displayed through a television, computer or other electronic display. A user of a device, integrated or coupled with an imager (e.g., a camera cell phone), images the machine-readable code, the device decodes the image of the machine-readable code, and the contents are displayed or otherwise performed (e.g., audio is played) on the device. The method generally further provides that the human-understandable contents contained in the machine-readable code be used, by itself or with further user input or selection, as the basis for a search of related information. This search could be performed on the device itself or by transmitting the human-understandable information (as may or may not be modified by user input or selection) to a server so that an external source, such as the Internet, could be searched for related information.

In order to minimize the manual input required by a user, the invention further provides a method of navigation and input. This method generally uses the same machine-readable code used to encode human-understandable information to be displayed on the device (although the method is not so limited to the use of that machine-readable code). The method uses that code not (or not necessarily) for the contents of the code but as a guiding system. The method correlates the location of the image of that code in the sensor of the device's imager to a location indicator on the display of the device. That location indicator can then be used to select a component of that display for purposes of using such selected component as one of perhaps many search terms.

BRIEF SUMMARY OF THE INVENTION

In our prior U.S. Pat. Nos. 6,098,882 and 6,176,427, we described methods for encoding and decoding digital information into a pattern, including a pattern printed on paper. We described how this machine-readable code could be placed alongside human-readable text or graphics such as might be found in periodicals or marketing materials.

In our prior U.S. Pat. No. 6,820,807 we described how the contents of a machine-readable code could contain data to link to a file, such as through a hyperlink.

There exist a number of search engines, such as those offered by Google and Yahoo, for searching the Internet. These search engines provide critical methods of distilling the vast volumes of information that exist on the Internet.

Between these sources of technology, information can be provided first by placing that information within a printed or displayed machine-readable code so that it can be decoded and reconstructed, and further information can be accessed from another source, either on a device or externally, and searches can be made based on user input. But, what is needed is a method that incorporates and integrates all of these functionalities as well as others. This integration is particularly important on a mobile device with limited user-input capabilities. For example, a user might see a listing of movies and desire a further display of information as to a particular movie, such as reviews of that movie and an indication of the local theatres showing the movie together with a listing of times. How would a user access this displayed information on a cell phone today? One possibility is that the user would text message keywords to a search engine based on keywords indicated next to the listing of each movie. This approach has at least 3 disadvantages: the user would have to manually input at least some text on a device where such input is cumbersome, any information that would result would come after a transmission of the text (which requires establishing a connection to a server) and, somewhat related, no information is immediately available that would allow the user to more precisely direct the search. Another approach would be to have the user image a machine-readable code where that code includes a URL to further information. Consistent with the previous approach, this has the disadvantages of providing only a narrow set of information—that indicated by the URL—and requires transmission (and consequent establishment of a connection) of digital data before useful information is displayed to the user. A further approach would be to include useful information (e.g., a brief review) in the machine-readable code. When the user images the code with a camera phone, the user could be immediately presented with useful information without the need of establishing a connection and transmitting data and then waiting for a return of data. And yet, the information presented is still limited and at the control of the person encoding the data. A further approach would build on the prior approach by also including URLs with the human understandable information encoded in the machine-readable code. This information may also be encoded in other entities and/or systems. For example, the information may reside in an RFID chip, or in a local WiFi or Bluetooth connection device, cell tower, or GPS device. This approach not only gives the user immediate information, but also allows for further information or files by clicking on the desired URL. But, the user is still limited to the information provided by the person doing the encoding of the machine-readable code. If the user wants to deviate from this pattern, the user is again relegated to the self-help approach of going to a search site and entering text to perform a search.

What is needed then, is a method where data is immediately available to the user together with any URLs deemed appropriate, and where the data provided in the machine-readable code could be further used to direct a search which could provide the user with an essentially unlimited number of further options for data to pursue. The present invention describes methods of selecting particular elements of the data encoded in the machine-readable code. The elements selected could be words, URLs or other text, graphics, audio or video.

The user could also select all such elements—i.e., the entire human understandable contents of the machine-readable code. In one embodiment of the invention, these selected elements, or all such elements, are then transmitted to a server which searches for further sources (URLs) based on those elements transmitted. For example, a machine-readable code could contain a brief review of a particular movie, "Named Feature". The text encoded in the machine-readable code would presumably contain the words, "Named", and "Feature". The user could select those 2 words and request a search based on those selections. The returned list of possible choices could include links to further reviews. That returned list could also contain links to lists of locations where the movie is playing. Based on prior requests made by the user (e.g., cookies placed in the device from prior user activity on the device), the list could contain a link to a list of theatres local to the user, together with times of showing. In addition, the information upon which the search is based may also include such localized information as the GPS coordinates, or other location coordinates, information regarding the direction in which the device is being pointed, as well as information stored about the user on the device itself, including address information, email address, phone number, and other contact information.

In another embodiment, the search is performed within a database contained on the device itself. The invention describes various methods by which that database is acquired by the device.

The invention's use of a machine-readable code affords another significant advantage. That same code can be used not only for the data contained therein but also as a key component in a method of navigation and input. This method associates the location of the image of the machine-readable code in the sensor of a device's imager with a location in the device's display. The associated location in the display could itself be part of the display by, for example, displaying a crosshair in the device's display. The device user can move the imager relative to the machine-readable code with the result that the associated display location would change and the crosshair location would change. Once the crosshair is over a display component desired by the user, the user could select that component by quickly moving the device's imager toward the machine-readable code.

DETAILED DESCRIPTION OF THE INVENTION

The invention is best described by reference to the preferred embodiment in which human understandable information is encoded in a machine-readable code and that information is used to provide the user of a camera phone a choice of text or graphics to select for purposes of doing an Internet search of those selected components.

While the primary focus of the description below is by reference to a camera cell phone, it should be understood that other devices could be used by the invention. One such device would be a phone primarily used for VoIP (voice over Internet protocol) but also containing a camera. In one such type of device, the transmission is partially or entirely wireless, such as through a Wi-Fi connection. Thus, for example, if a person has such a device (i.e., a WiFi camera phone) and is in an area with WiFi service, that person can employ the invention without the need to otherwise be connected to either cell service or a computer.

Description of Overall Method of Search

Figure 1:
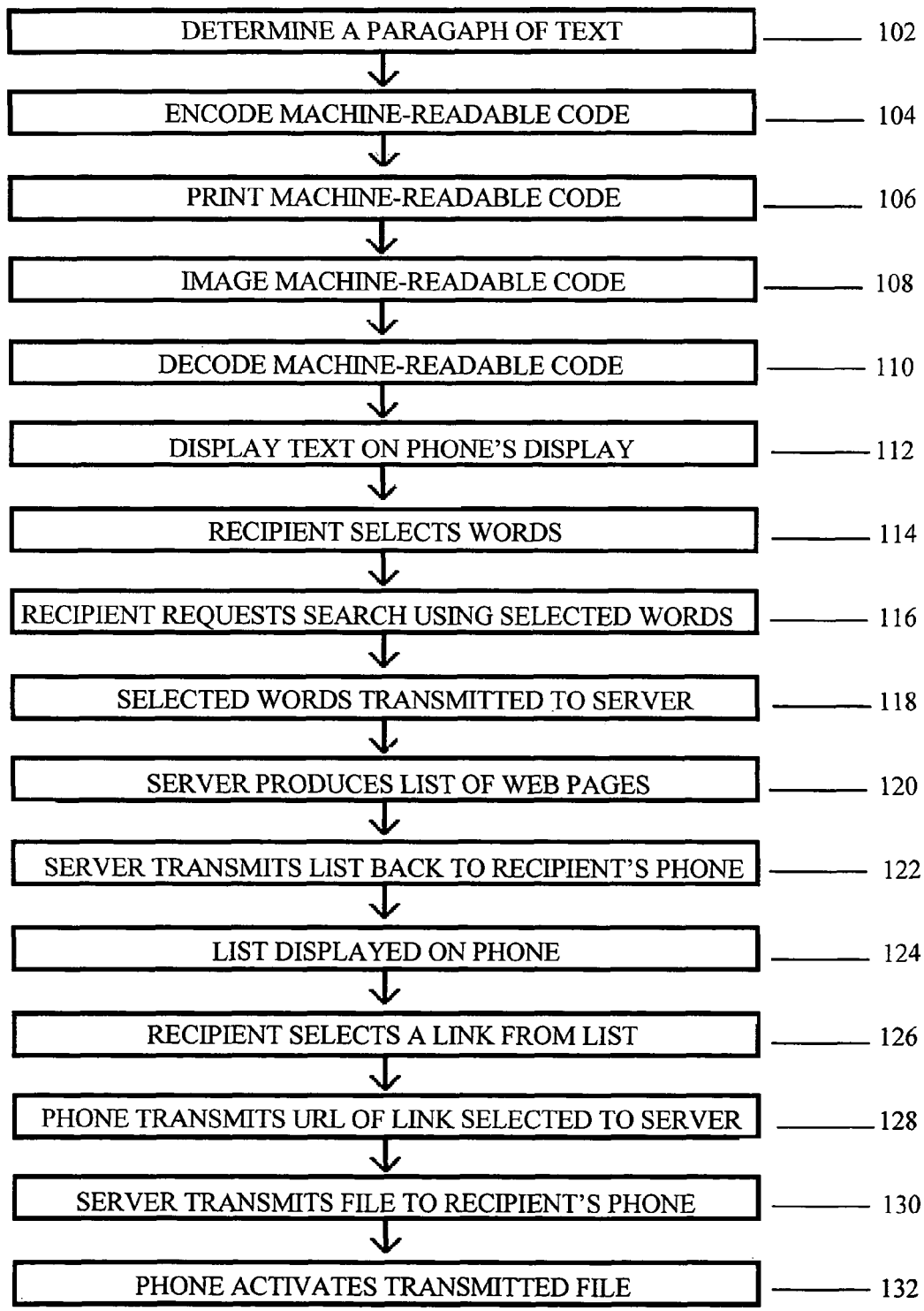
FIG. 1 is a block diagram describing the overall process for searching using human-understandable components supplied in a machine-readable code.

The overall method of the preferred embodiment is described by reference to FIG. 1.

First, the person wishing to provide digital data determines what text or other human-understandable information to encode, step 102. This information may be anything capable of being expressed as digital data within the data carrying constraints of the machine-readable code selected. The more obvious choices would be text and graphics, but could also include sounds, animation, video, motion (e.g., as might be part of computer action game which such motions could be expressed digitally so that upon later activation, the device would cause motion or the sensation of motion) and aromas. The description that follows assumes unless otherwise indicated that the information selected would be restricted to text and graphics, it being understood that this limitation is not an inherent limitation of the invention but is instead being done solely for purposes of aiding understanding of the reader.

The content of that digital data contained in the machine-readable code could include advertising where that advertising Is based on the other content of the digital data. For example, where the main content is text discussing a new product, advertising content might also be included from a merchant that sells that product. This advertising could be derived automatically based on the use of an auction system for keywords, as is current practice for Internet search engines.

The person wishing to provide digital data would then encode the information selected in step 102 into a machine-readable code, step 104. While any of a number of machine-readable codes could be used for this purpose, the preferred embodiment uses a 2d matrix code, preferably the symbology (PaperDisk® from Cobblestone Software, Inc. of Lexington, Mass.) described in our prior U.S. Pat. Nos. 6,098,882 and 6,176,427. The result of this encoding process is an image file of the machine-readable code containing the human-understandable information selected in step 102.

The person wishing to provide digital data would then print the machine-readable code, step 106. The code printed would be the code produced in step 104. It should be noted that while printing the code would normally be understood to mean printing on paper, in some instances the printing would be otherwise. "Printing" for this purpose should be understood to also possibly include displaying the machine-readable code on a computer display, a electronic billboard, Elnk display, display of other electronic devices, such as a PDA or a phone or vending machine, television screen, movie theatre screen, etched in metal, stone or other substance, or otherwise displayed in or on any other medium capable of being differentiated in at least 2 optical states. Also, while the preferred embodiment assumes printing in visible ink or through a visible manifestation, other embodiments use printing or display through means not visible by the human eye—e.g., by use of infrared or ultraviolet ink. In the instance where the machine-readable code is printed on paper, that paper could be books, periodicals, newspapers, flyers or other marketing collateral, packaging, invoices, letters, memoranda, etc. Having printed the machine-readable code, the person wishing to provide digital data could then distribute those printed materials. Such distribution would be to a person or persons wanting or potentially wanting access to the printed digital data.

The recipient of the machine-readable code printed in step 106 would then image the printed machine-readable code, step 108. For purposes of further describing the invention, the description that follows focuses on the use of a camera phone as the device used by the recipient of the printed machine-readable code. It should be understood, however, that the invention is not so limited. For example, the invention could be used by the recipient through a personal computer with attached webcam, flatbed scanner, pen scanner, or other device capable of acquiring the machine-readable code; or through a PDA with an imager. With a camera cell phone, the phone would need an application installed capable of imaging and decoding the machine-readable code, such applications being known to those skilled in the art. Such application could be installed on the device through the normal means, such as by being part the device's operating system, or by a cell phone carrier that provides a camera phone pre-installing the application, or by the user installing the application in the manners currently practiced for add-on applications. Another possibility is that when a device user uses another method to establish a physical world connection (e.g., a method established by a competitor of a person using the current invention), then within such signal could be not only a request to establish a connection between that machine-readable code and an online source of data, but also a request to download and install an application of the present invention. Thus for example, if a competing technology is capable of only encoding a reference to web pages within a machine-readable code, then that reference could be to a web page which when accessed would not only transmit to the user the webpage but also the application of the current invention which could then be installed, automatically or with further user involvement. Alternatively, the competing code could simply contain a signal to download the application of the present invention without also downloading a webpage or other data. As still another alternative, the web page could contain links that the user could select which would download the application. In addition, the code could instead encode a SMS message which would automatically be sent, and the response might be a further message sent in return to the device which would automatically, or with minimal user consent, bring up such a web page, or download from such a web address. In either instance, it is preferred that the application be downloaded with the user's foreknowledge, although this need not be the case. The user would invoke such an application on the camera phone and then pass the phone's camera over the machine-readable code until the image is successfully acquired by the phone.

The recipient's device then decodes the image of the machine-readable code, step 110. As discussed above, this step is preferably part of the application installed on the device, and occurs automatically upon the successful acquisition of the image of the machine-readable code.

Figure 2:
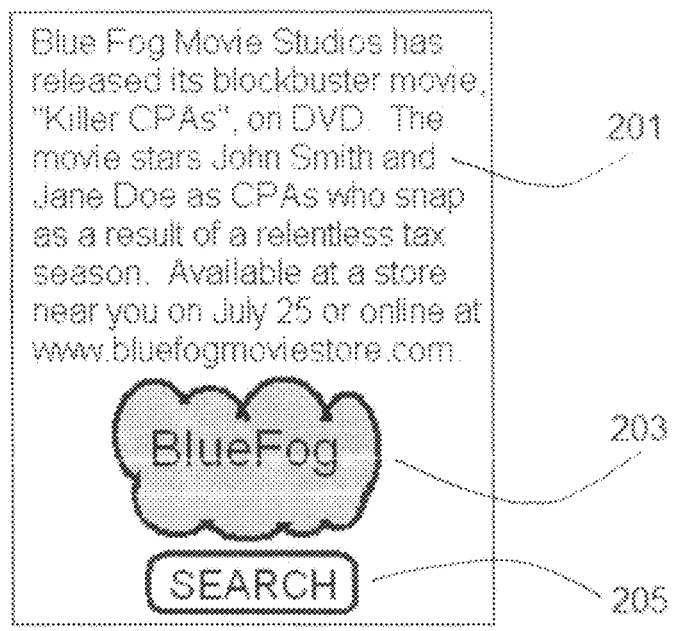
FIG. 2 is an example of a device's display as might be produced from the digital data contained in a machine-readable code.

In step 112, the recipient's device then acts on the data decoded from step 110. In the present example where the data consists of human-readable text and/or graphics, the device acts on the data by displaying that text and/or graphics on the device's display screen. This possibility is illustrated in FIG. 2, described more fully below. In other instances, the device will act on the data decoded from the machine-readable code in other fashions. If the data includes audio, the device acts on that data by playing the audio. If the data is video, the device will act on the data by displaying the video. If the data is a combination of data to be displayed and audio, the device will act on the data by displaying the visible elements while playing the audio. It should be understood that the device will act on the data in whatever manner is dictated by the data that is within the functionalities of the device or some other device coupled to the device performing the decoding. While the device would preferably act on the data automatically—i.e., the device would act on that data immediately following decoding without further interaction by the recipient—in other instances some or all of the data is not immediately acted on by the device. In some such instances, the device stores the data while in other instances, the device first queries the recipient whether some or all components of the data should be acted on. The person desiring to provide digital data is preferably given the ability to select which such circumstance triggers the device to act on the data.

Having been presented with the physical manifestation of the data decoded by the device, the recipient is presented with the ability to request further information in step 114. In the present focus where the data acted on in step 114 is human-readable text or graphics, the recipient could select the words or graphics in the display to use as the basis for further search. The invention provides a number of ways for the recipient to make this selection. In two such methods, the recipient uses the device's keypad to make the selection. These methods are further described by reference to FIGS. 2, 3 and 4. The invention describes a method of navigation and input by reference to FIGS. 5, 6 and 7, which method could be used as a method of selection. In another method, the recipient uses voice input, as is commonly known by those skilled in the field. In a further possibility, where the device has a touchscreen, the recipient would use a stylus or finger to highlight words or other items. A further possibility is the use of scrolling buttons or rollers or balls or other scrolling touch mechanisms to navigate to a selectable item. In yet another method, the recipient uses text messaging, either alone or in combination with other methods of input. For example, the methods described below for choosing text or graphics from the data contained in and decoded from the machine-readable code and displayed on the device could be supplemented by commonly used text messaging techniques. This might be called for when the text displayed from the data contained in and decoded from the machine-readable includes some but not all of the search words that the recipient believes necessary to frame the desired search. The display on the device would preferably include a text box to display search terms input by the recipient. Of course, the text box could also contain the items selected by the recipient from the components contained in the machine readable code and displayed for recipient selection.

While the focus thus far has been on the selection of text, the invention should not be understood as being so limited.

The recipient could also select sounds to be searched (see www.musikube.com for technology that matches sound snippets against a database of audio). Also, the recipient could match graphics against a database of graphics. In this instance, there are at least three ways of doing the matching. In one such instance, the graphic from the data encoded in and decoded from the machine-readable code is compared to a database of graphic images. In this instance, the graphic is in essence a visible graphic as such (i.e., the device would transmit an image file of the image, not the digital data from which the image was derived). There are known techniques for performing such matching of visible images—see, for example, www.evolution.com and www.mobot.com. It should be noted that the invention provides a decided advantage over the audio or images normally expected by existing technology used to match audio or images—those technologies were developed with the expectation that the input would contain some level of distortion. The present invention should, however, be able to provide essentially perfect reproductions because the audio or graphics are stored digitally in the machine-readable code. A second way of matching sounds or images is by matching the digital representation of the sound or image in the machine-readable code (e.g., the digital data from which the image was derived) with a database of sounds or images. This method should normally produce better matching because the matches should be exact or nearly exact (although, perhaps differences in scale or other minor differences would exist). A third method is by the storage of tags in the metadata associated with those sounds or images.

In step 116, the recipient would request a search based on the selected components. In the present focus, the recipient would select an icon or button intended to initiate the transmission. One such possibility is discussed below by reference to FIGS. 2, 3 and 4. In another possibility, the recipient would orally request the initiation of the transmission as by speaking into a microphone of or attached to the device an appropriate word such as "search". Other possibilities, such as text messaging, could likewise be used.

While the recipient is given the opportunity in step 114 to select from among the components provided, the user is preferably also given the ability to select the entire content of the components provided to request a search. In the preferred embodiment, if the user requests a search in step 116 without first selecting components to search in step 114, then the invention would transmit a request that a search be performed using all of the components. This might be especially useful where the components involved are minimal, such a single word or a few words (e.g., a company name, brand name, other product name, book name, movie name, or URL).

As a natural extension of the focus presented here, the device would also store the search terms requested so that the recipient could again use those terms for a future search, with or without modification. Of course, this storing of previously requested search terms could occur and be used to good effect in a different context. In one such context, for example, where the recipient has performed a search on a personal computer using certain search terms, the recipient may want to capture those search terms for later use. The invention could allow the recipient to print out a machine-readable code from the personal computer such that the recipient could later use those search terms as the basis of a later search, where such later search could occur on a mobile device, although the invention should be understood as not being so limited. So, for example, a recipient may do a search on his or her personal computer for a particular movie (using the title of the movie as the search terms) and, as a result of that search, print out a review of the movie. By also requesting that printout to include a machine-readable code containing those same search terms, the user would have ready access to those terms if a needed search is desired. So, if the recipient later decides (while away from the computer) to view the movie, performing a search on a mobile device by having that device image and decode the machine-readable code containing those search terms could produce a listing of where that movie is playing. In one variation, the recipient could modify the search terms in the machine-readable code to be printed by including, for example, the movie name as well as the locality and terms such as "theatre" or "now showing at" or "movie listings". In another variation, the recipient manually supplements the search terms included in the machine-readable code to include these terms. In all of these cases, location based information, such as derived from a GPS device, could be employed to narrow the search to appropriate targets in the immediate neighborhood.

The device would then, step 118, transmit the selected search request, using the components selected in step 114, to a server.

The server, having received the requested search terms or other components, would process the request to the end of producing a list of URLs of web pages or other files to be sent to the recipient. The techniques for conducting this search are, in the preferred embodiment, consistent with presently known search techniques. Indeed, the search using text as keywords could be performed by using existing search engines such as Google, Yahoo, Ask.com, Alta Vista, etc.

Variations from existing search techniques could be used to good effect. One such technique would be to add tags to the human-understandable components encoded in the machine-readable code—e.g., the machine-readable code could include both data to be displayed or otherwise provided to the recipient and these tags, which would not normally be displayed or otherwise be used except for the purpose of facilitating the search. These tags could be used to give additional weight to certain results produced by the search. For example, if the human-understandable data encoded in a machine-readable code provides a review of a newly released movie called "Killer CPAs", the tags, "Killer CPAs", "review", "theatres", "New York" (as might be added if the machine-readable code is printed in a New York newspaper) might be added to influence the search results. The tags might also include URLs so that the search results would include those URLs. Of course, the person providing digital data could also direct that the tags be used as the exclusive basis for a search—i.e., the recipient would not select search terms but would just request a search where the basis of that search would be the tags directed to be used (by the person providing the digital data) as the basis for a search. Another technique that would be helpful in the present context is to give extra weight to web pages that are designed for the constraints of mobile devices, such as WAP or .mobi sites. Indeed, the person wishing to provide digital data may place a restriction (as through the use of a tag) on the search results such that the only results returned would be those suitable for portable devices. Consistent with some current practices, the search results may be influenced by commercial considerations. For example, advertisers may, through contractual arrangements (e.g., by a payment as might occur through an auction process or otherwise), be given greater weight in the ranking process or be given space reserved for paid sponsors. In one such instance, an auction could be conducted for the tags to be included and for the weight to be given to the tags included such that higher priority is given to the highest bidder for the tags, which could influence the listing of results in general or the listing of results in the sponsored portion of the list. This auction could be conducted by the person wishing to provide digital data, by the person maintaining the search server, if different, or by both through contractual arrangement. Through the techniques described above, the server would produce a list of results in the form of links to files on the Internet (in the present focus), step 120.

The server would transmit that list to the recipient, step 122. This transmission would be consistent with current practices of transmitting search results to a requester, as particularly applicable when the recipient's device is a mobile device.

This list of results would then be displayed on the recipient's device, step 124. The display, or other action, may include data in addition to the search results. For example, the device might also display an advertisement or play an audio recording, or play a video snippet that is transmitted to the device along with the search results (or already stored on the device).

The recipient is then presented with the opportunity to select a link from that list, step 126, consistent with current practices of allowing recipients to choose from a list of links. Of course, at the recipient's option, no further link may be desired or chosen, in which case the process is completed.

The recipient's chosen link would then be transmitted back to the server, step 128.

The server would receive the request and send back the requested file, typically a web page, step 130.

Finally, the device activates the transmitted file, step 132. Of course, the recipient could make further requests from that point forward.

The invention requires a manner in which the recipient can choose particular words or other components from those presented from the data encoded in the machine-readable code, as discussed in step 114. The following description, by reference to FIGS. 2, 3 and 4, explains one such manner. While this description is made by reference to visible, static, components displayed on a device (which such components are those which might be encoded in a machine-readable code), it should be understood that the invention is not so limited. For example, if the data presented on a device is audio, an icon might be presented on the device signifying the audio, and such icon might be selected, as described below, in a manner consistent with selecting words or graphics. Similar techniques might be used for video, movement actions, smells, etc.

FIG. 2 is an example of what might be displayed on a portable device such as a camera cell phone. The display consists of 3 main components—text, component 201; a graphic (in this case, a logo), component 203; and a search icon, component 205. All of this data can be encoded in the machine-readable code described previously. Or, it may be advantageous to provide for the inclusion of the search icon in the software application so as to save space in the machine-readable code.

In the present illustration, the user can select any word in component 201 and/or the graphic, component 203. One such method of selection is by using the directional keys that are typically a part of cell phones.

Figure 4:
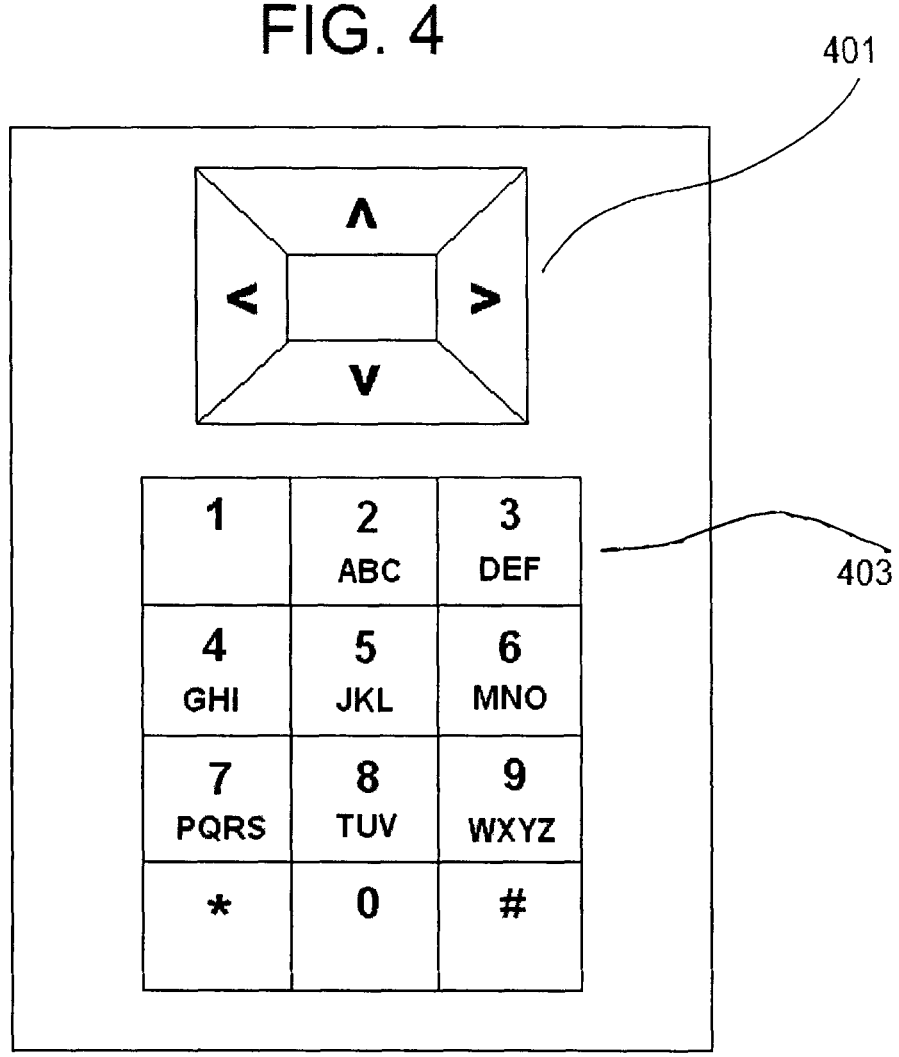
FIG. 4 is an illustration of a keypad on the face of a typical mobile phone.

FIG. 4 illustrates a keypad as might be found on a typical cell phone. This keypad consists of 2 main components. Component 401 is a set of 5 keys—one for each of the directions (in clockwise order) up, right, down and left and the key in the middle for enter, used for selection. Component 403 is a set of 12 keys as would be found on a typical telephone, used for dialing, text messaging as well as other purposes including one described below.

In the present method of selection, each word in the display, each graphic and each icon is separately selectable—i.e., each such word, graphic or icon (hereafter referred to as items or component items) can be selected with or without other such items being selected. In the present method, the process begins by placing a cursor next to or underneath the first word "Blue" in the text found in component 201. Of course, instead of a cursor, the item which can be acted on may instead be highlighted or shaded or otherwise made distinguishable from other items. If the recipient wishes to select this first word, "Blue", the recipient would press the enter (i.e., the center) key in component 401. If the recipient wishes to highlight other items (with or without selecting the word, "Blue" as just described), the user would press the 4 directional keys in component 401 to move the cursor to such other items. Once the cursor is next to or underneath the next desired item, the recipient would press the enter key. The recipient would repeat this process until all desired items are selected.

Figure 3:
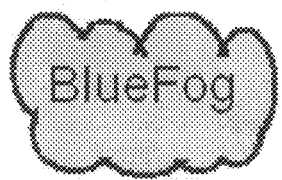
FIG. 3 is the same device display from FIG. 2 where particular components of that display are highlighted as a result of the recipient selecting such components.

FIG. 3 illustrates a display where a series of such selections has been made. More particularly, FIG. 3 should be understood as being the same information as displayed in FIG. 2 but with 3 words selected by the recipient from the items being displayed in FIG. 2. The 3 words selected are, 'Killer', 'CPAs', and 'DVD'. For purposes of this discussion, it should be assumed that only the words are selected for purposes of later use by the search method, not the quotes preceding or following such words. Of course, the recipient could add these quote marks or other embodiments might include them by default. As previously indicated, the cursor is first placed next to or under the first item in the display, the word, 'Blue'. To select the 3 words, the recipient would press the down key of component 401 twice, placing the cursor next to or underneath the word, 'Killer'. The recipient would then press the enter key (i.e., the center key) of component 401. The result of this action is that the word, 'Killer' would be highlighted (surrounded by a grey background) as illustrated in FIG. 3. Note that in this illustration, the gray background is also applied to the quote mark although, as previously indicated, that quote mark is presumed to not be part of the search term. The recipient would then press the right key of component 401, which would place the cursor next to or underneath the word, 'CPAs'. The recipient would then again press the enter key of component 401, resulting in that word also being highlighted. The recipient would then press the right arrow twice, moving the cursor next to or underneath the word, 'DVD'. The recipient would again press the enter key of component 401, highlighting 'DVD'.

By pressing the down key of component 401 6 more times, the cursor would be on the last line of text in component 201. By pressing the down key of component 401 again, the cursor would be next to or underneath the graphic, component 203. While not chosen in the present illustration, if a recipient wanted to select that graphic, the recipient would press the enter key of component 401, and that graphic would be appropriately highlighted. In the present illustration where that graphic is not highlighted (but the 3 words as described above are highlighted), the recipient would instead press the down key of component 401 once more, placing the cursor next to or underneath the search icon, component 205. By pressing the enter key of component 401, the recipient would thereby request a search using the selected words, step 116.

If the recipient desired to select only certain letters of the displayed text of component 201, the invention would allow the recipient to do that. For example, of the word, '"Killer', the recipient may only want to highlight the letters, 'K', 'i', 'l', and 'l'. The invention would allow the user to do this by pressing 2 keys simultaneously (or in succession). For example, with the cursor next to or underneath the word, '"Killer', the user could press the right key of component 401 and the asterisk key of component 403 simultaneously, the result of which is that the cursor would be next to or underneath the character, 'K' (i.e., the cursor would have skipped past the '"' (quote) character. In the fashion indicated above the recipient could select the character 'K' by pressing the enter key of component 401. By again simultaneously pressing the right key of component 401 and the asterisk key of component 403, the cursor would be next to or underneath the character 'i'. The recipient could select this character in a manner described previously. The recipient could then repeat this process for letter 'l', and 'l', the result of which is that the word 'Kill' would be highlighted, ready to be sent as a keyword to be searched. If the recipient instead wanted to send individual letters as search terms, the use of a different combination of 2 keys could be utilized, e.g., the enter key of component 401 as well as the '#' (pound) key of component 403.

The invention allows other methods of recipient selection of words. One such method uses the keys of component 403. The associated letters of these keys are used to select the initial letter or letters of a word in a display until there is only one word that matches the keys pressed. As each key of component 403 is pressed, the words remaining that match the keys pressed up to that point (i.e., since initiation of this process or the last word selected) would be highlighted, with this highlighting being done in a manner different from the highlighting of words that are selected. For example, where selected words are highlighted by use of a gray background, the highlighting of the words still left as possibilities under the current process could be done by using a pink background. To highlight and then select the same 3 words described above, the recipient would press the keys '5', '4' of component 403, the enter key of component 401 (thus selecting the word, 'Killer', where the quote character and case are ignored for this purpose), keys '2', '7' and '2' of component 403, the enter key of component 401 (thus selecting the word 'CPAs', keys '3' and '8' of component 403, the enter key of component 401 (thus selecting the word, 'DVD'), the keys '7', '3', '2', and '7' of component 403 and the enter key of component 401 (thus selecting the search icon and, consequently, initiating the search request). Where using the number keys of component 403 would result in more than one word still under consideration.(i.e., more than one word has letters all of which match the letters of the keys of component 403 thus far pressed), the keys "*" and "#" can be used to cycle through the possibilities until the desired word is highlighted. Then the enter key of component 401 is pressed to select that highlighted word. Of course, one skilled in the art would add such enhancements as necessary to further facilitate the method of input, which could, for example, combine the two methods of selection described previously.

As an alternative (or in addition), speech recognition techniques might be used to select an item or a list of items.
Method of Navigation and Input Described The invention provides for a further method of navigation and input, including for purposes of selecting text and initiating a search request. This method utilizes the machine-readable code already provided. In principle, the method could, of course, utilize another machine-readable code or part of a machine-readable code (e.g., a "landmark" used by the machine-readable code), even just an icon or mark or a company or brand logo, a picture or other image or some other printed or displayed item—known techniques already exist to find these possibilities. While this discussion will focus on the use of a machine-readable code, it should be understood that the techniques are available as applied to the other visible possibilities.

For purposes of this navigation and input technique the content of the machine-readable code might be irrelevant. In other embodiments, the code could be relevant for further functions of the method of navigation and input. In one such embodiment, an encrypted (or otherwise protected) code could allow navigation only to a select user or users (e.g., premium users could be given further access to map functions such as a map outside the core map or the method of navigation and input would be limited to premium users of an underlying game application). As a further possibility, the code could contain instructions that would by themselves indicate that the method of navigation and input be activated (i.e., "turned on") as long as the code is in view. Also, alone or in combination with the other functions indicated, the code could contain a message to the user that the method of navigation and input is available, possibly together with instructions on the use of such method.

While the content of the code may or may not be relevant as discussed above, what is relevant is the presence of an appropriate code (typically, this would mean appropriate to the underlying application being utilized which, in the present focus would be the display and search application as previously described) and the position that code occupies in the imager sensor of the device being utilized. An appropriate code should be understood to mean that the underlying application is capable of recognizing the presence and size of such code, as would typically, but not necessarily, be the case because the application decodes such code to derive the digital data contained therein. The method takes advantage of techniques that at least some symbology decoders utilize to decode a symbol. As part of the decoding process, these decoders determine the location of the image of the machine-readable code in the image captured by the imager. And, at least some such decoders operate by capturing a continuous stream of images, attempting to identify a machine-readable code from each of such stream of images, or a subset thereof. As a result, the decoder could capture a steady stream of images containing a machine-readable code, but the location of that code in each image could change. And, a device user could control the position of the code in the image by tilting the device's imager (typically by tilting the device itself because the imager is typically in a fixed position in the device). By so tilting the device imager, the device user could change the location of the machine-readable code in each image captured as part of the steady stream of images (or some subset) captured by the imager. The location data captured by the decoder (i.e., the location of the machine-readable code within the imager's sensor) could be used to navigate within the application.

An example illustrating the method of navigation and input is described by reference to FIGS. 5, 6 and 7. As described more fully following this description, this method of navigation and input itself has many variations, some of which are described, some of which would employ techniques that would be obvious to those skilled in the field once presented with the method as described.

Figure 5:
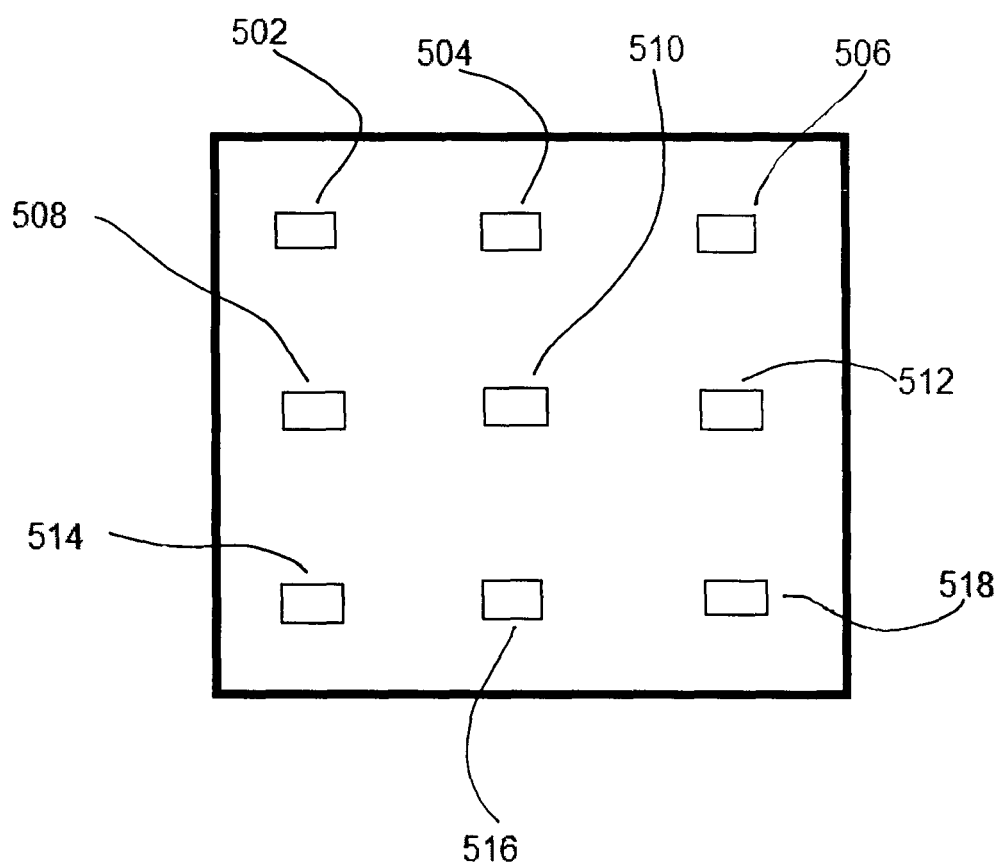
FIG. 5 is an example of an image that might be contained within the sensor of a device's imager, where an image of a machine-readable code could be located in any one of several alternative positions in that sensor.

FIG. 5 represents the rectangle of image pixels of the imager sensor. Thus, subject to a significant qualification discussed below, whatever is presented on the image pixels is presumed to be "seen" by the imager—more particularly, whatever is present on the image pixels is presumed to register within those pixels as data capable of being used by the rest of the system. FIG. 5 is intended to illustrate a number of different positions within an imager sensor in which an image of a single machine-readable code might be found. In other focuses, as might be the case where different or additional purposes are being sought, more than one machine-readable code might be found within the imager sensor. It should be understood then, that in this main focus, only one machine-readable code is expected. This is the significant qualification mentioned above—while the imager sees whatever is on its sensor, the machine-readable codes illustrated in FIG. 5 are just hypothetical alternative positions for one code actually present. The discussion of the present focus assumes one and only one machine-readable code within the imager sensor. As previously mentioned, other focuses assume more than one code present in order to accomplish other purposes and, even the present purpose can be accomplished where more than code is present by, for example, providing algorithms that search for a particular code (a task currently accomplished by the typical decoder) rather than any code as described below.

The description of the present focus assumes the less computational-resource-intensive situation where only one machine-readable code is present on an imager sensor at a given time.

Figure 6:
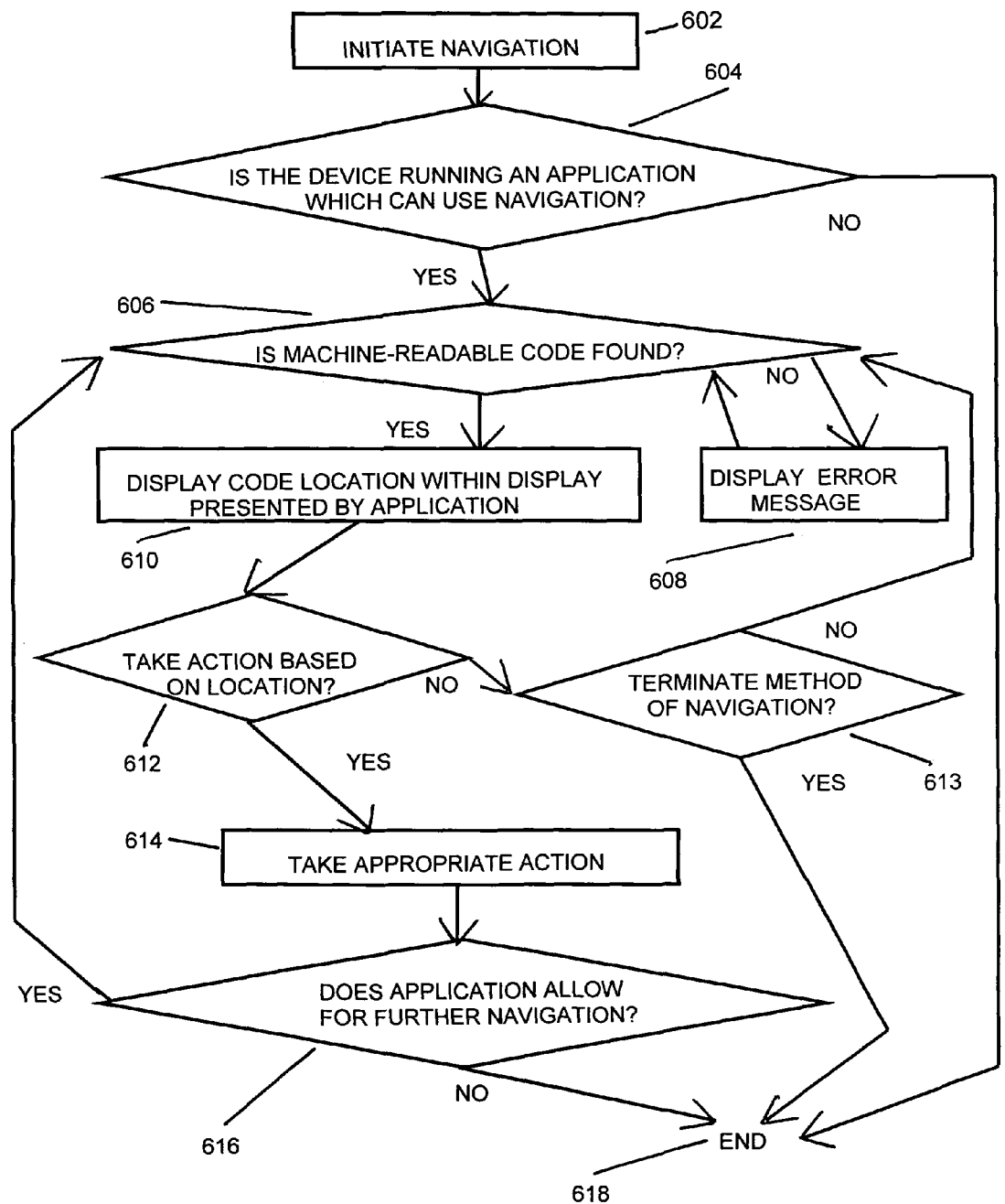
FIG. 6 is a block diagram describing the process of the method of navigation and input using the location of a machine-readable code relative to the sensor of a device's imager.
Figure 7:
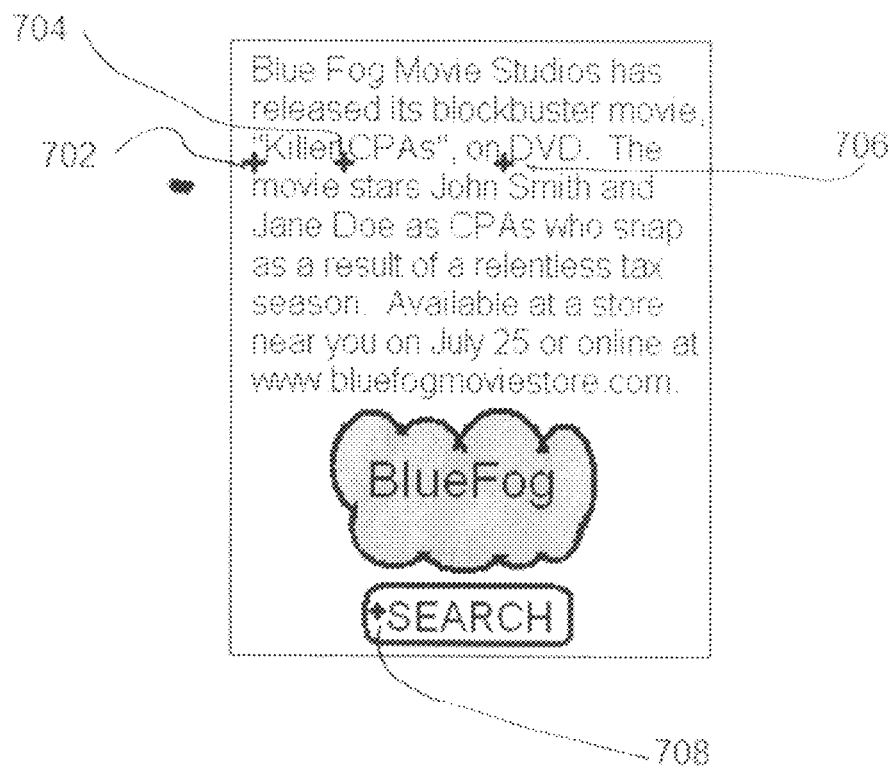
FIG. 7 is the same device display from FIG. 2 where a location indicator (crosshair) produced by the method of navigation and input is indicated at various alternative locations within the display.

The method of navigation and input is best understood by reference to FIG. 6, which represents a block diagram of the steps for accomplishing the method.

In the first step, step 602, the method of navigation and input is invoked. In the present focus, this is done by the user pressing a certain button, the "*" key of component 403. Of course, any other key or button accessible on the device could be used for similar effect. In some embodiments, no key need be pressed. In one such embodiment, the machine-readable code (or other instructions, such as might have been included in another machine-readable code or such as might be included in the underlying application—e.g., there may be applications developed with this method of navigation and input as the default method, and by default, the device will initiate the method upon launching the underlying application) contains instructions directing the device to use the present method of navigation and input. The present focus gives the user control over use of this method of navigation and input by generally requiring a user action to initiate the method and, again, that action is assumed to be the pressing of the "*" key of component 403.

The next step, step 604, determines whether the device is currently running an underlying application which can make use of the method of navigation and input. The focus at present is that applications are developed integrating this method. Of course, the method could be integrated with certain other applications through a plug-in or by otherwise "hooking" in through the other applications' APIs and, in principle, the method could in principle become part of operating systems, making the method available to any or essentially any application using the operating system. The example that follows uses the method of search of the invention as the underlying application that can utilize the method of navigation and input. Many other underlying applications could make good use of the method, some of which are described below.

If the method determines that the device is running an underlying application which can make use of the application, then the process continues. Otherwise, the process will end, step 618.

The method next determines whether a machine-readable code is found, step 606. The present focus can only find a machine-readable code if an image of an appropriate code is contained within the sensor of the device's imager. What is an "appropriate code" depends on the method's algorithms. In the present focus, only a PaperDisk® pattern is assumed to be an appropriate code. Of course, other embodiments could search for other codes, or any of a number of codes, or other marks, etc. In the present focus, the decoder of the PaperDisk® symbol is designed for mobile devices (and webcams) such that it constantly searches for a code within the imager's sensor from a steady stream of images captured by the imager. In this step 606, the invention essentially utilizes these same algorithms. In other focuses, such as where the method would search for other codes, the method of navigation and input could appropriately use similar techniques employed within those decoders.

The method of navigation and input will preferably allow some period of time to allow the method to find the appropriate code. This allows the user an opportunity to move the device around somewhat in search of the code. Five seconds would be an appropriate period of time. But of course, other designers may desire to alter this to more or less time, or the designer may allow the user to vary the amount of time. This might be called for, for example, where a new user would need more time than an experienced user, and the flexibility of altering the amount of time would allow for this situation. Of course, the method could decrease the amount of time based on the past experience of this user. As the user uses less time to acquire the code, the method would shorten the time for future acquisitions. Whatever the time set for acquiring a code, once that time is passed, the method would preferably display a diagnostic (error) message indicating that the code could not be found, step 608, and then terminate the method, step 618.

If the method locates a machine-readable code, then the method has something to operate on, and the method continues on to step 610.

If the method locates a machine-readable code, it does so because an image of that code is within the sensor of the device's imager. And, as previously described, in typical decoder algorithms, the location of that code image within the imager sensor is also known. For purposes of this discussion, it is assumed that the location of the code is determined to be, more precisely, the location of the uppermost, leftmost part of the code detected by the imager. Of course, the code could be determined to be some other location within the code, such as the center of the code. That imager location is then mapped by the method of navigation and input to the device's display. I.e., the relative location of the code image in the sensor is used to determine the same relative location in the device display. For example, if the device determines that the code is located 10% down from the top and 20% right of the left-most edge of the imager's sensor, then this same location (i.e., 10% down and 20% right of the upper left corner of the display) is indicated for the display. In step 610, the display indicates this relative location of the code. In the present focus, this indication is provided by a crosshair (i.e., an equal-sided cross or "plus sign") displayed in the device display. This crosshair should be large enough to be readily visible to the user, but not so large as to be obtrusive. For purposes of this discussion, it is assumed that the crosshair is 10 points, in the sense of font size. The crosshair is also assumed to be of a color other than black (e.g., red), but again, this is up to the designer based on the circumstances. Naturally, the indication can be something other than a crosshair, the indication could be some item otherwise displayed in the underlying application (e.g., if the underlying application is a racing game, the indication of location could be a racecar placed at that location) or there may be no indication at all if the circumstances so warrant (e.g., the value of knowing the location is outweighed by the obtrusiveness of such visible indication, as might be the case of a mapping application which uses the location for purposes of moving the map on the device display).

The location of the code in the sensor and the consequent display of that location in the display is typically for purposes other than just displaying that location. The code location in a sense typically serves a dual purpose (in addition to the use of the data in the code). One purpose is to provide visual cues to the user as to where the code is located. But typically, this information is of little value to the user without a further use. In the next step, step 612, the method determines whether the underlying application invokes this second purpose, to take action based on the location of the code in the imager's sensor, as typically displayed in the display, as discussed above. In the present focus, where the underlying application is the search method of the invention, the location information is primarily used to focus attention on a particular component or component item in the display. For example, (and as more fully described by reference to FIG. 7), where the underlying application is the search method of the present invention, the method of navigation and input can be used for, inter alia, selecting particular components or component items of an image, as well as the search icon in order to form the basis of a search request. This method can be used in lieu of the method previously described which involves the user pressing keys on the device to select components or component items of a display for searching. As more fully described below, the second use in other applications depends on the application.

There may be some applications where there is no need for a dual purpose, where displaying the location is all that is needed for that application. For example, if a person developed an application of a butterfly flying around an outdoor setting, displaying the location information could result in a display where the butterfly is flying to locations in the display based on the location indicated by the method of navigation and input. In this way the user could direct where the butterfly is located in the displayed setting.

Where the method determines that no further action is to be taken, the method in effect sets up a loop. This loop cycles through steps 613, 606, 610 and 612. The essence of this loop is that the method will continue to display location information until terminated, step 613. Termination can occur through a number of means. In one, the user affirmatively selects termination, such as by ceasing to press the key used to activate the method, or where no such key press is necessary, by pressing another key to terminate the method, such as the "#" key of component 403. Another possibility is that the method is terminated upon termination of the underlying application. A yet further possibility is that the method is terminated upon the device being turned off. Upon termination, the method ends, step 618. Another possible outcome of the looping process is that at some point in the looping process, the device's imager "loses" the machine-readable code, typically because the user has focused the device's imager away from the code. The method would react to this circumstance in a fashion similar to that described previously, display a diagnostic (error) message indicating that the code could not be found, step 608, and then terminate the method, step 618. As previously suggested, this should be done only after an appropriate period of time for searching, say 5 seconds, and here, it might also be appropriate to display a prior warning that the method is about to be terminated due to non-acquisition of a code, which such message should precede the other message indicating termination by some period of time, say 5 seconds, in which instance the further waiting period of, say, 5 seconds, may not be called for.

If alternatively, the method determines that some further action is to be taken, then the method will take such action, step 614. In the underlying application of the present application, that action would be to highlight the component or component item of the display such that that component or component item can be used as the basis for a search. This leaves open the question of how the method would actually select that component or component item. The description to this point places a location indicator (e.g., a crosshair) over a component or component item. The method also needs a manner of selecting such component or component item. Consistent with the discussion of the manner of selection previously described by reference to FIGS. 2, 3 and 4, one possibility is for the user to press the enter key of component 401. Other possibilities could include a touchscreen tap, and the pressing of some other key.

In keeping with the spirit of the present method of navigation and input, the method provides a distinct manner of selection that does not require physical action other than one involving the capture of the same machine-readable code otherwise used by the method. More particularly, the user can indicate the desire to select by quickly moving the device's imager forward, closer to the machine-readable code. While any of a number of possibilities exist for this movement to register as an indication of a desire to select, the present focus assumes that if the machine-readable code increases in size by at least 50% (or some similar, determinable percentage) in each direction within a period of no more than 2 seconds (or some similar, determinable period of time), then this action will be interpreted by the method as an indication of selection. The decoder will typically know not only the location of an image of a machine-readable code, but also the size of that code (in image pixels) in the image. The method can track changes in the size of the image of the code as well as the timing of such increase in order to make the determination of the user's desire to select the display component or component item which is pointed to by the locator—i.e., in the present focus, the component or component item underneath the crosshair. Of course, other similar means to determine selection could be applied. One such possibility determines selection by virtue of the code decreasing in size by a given amount in a given amount of time (e.g., 50% in each direction within 2 seconds). A yet further possibility could combine the prior two possibilities such that if the user causes the code to either increase by 50% or decrease by 50% within 2 seconds, then selection will be indicated. Where the method detects the indicated change within the allotted time frame, the method could also ignore any change in location that might take place while the change in size is taking place within that timeframe. By so ignoring such change in location, the method would assume that the component or component item being selected is the component or component item under the crosshair prior to the user starting the process of actually selecting that component or component item. This feature could be important in instances where the very act of selecting might otherwise change the locator to a component or component item other than the one intended by the user. This could otherwise happen because the user may not be able to control his or her hand action to simultaneously focus the locator on the same display component or component item and make the selection by moving closer to (or further away from, as the case may be) the machine-readable code. In any instance, it would be expected that most users would be able to exercise such control after some practice. In this instance, the method's ignoring of change of location occurring during the selection process would be primarily important for new users.

While in the embodiment above the selection of an action, such as the selection of a search term, is accomplished by altering the distance from the imager to the machine-readable code, other embodiments would accomplish the selection task differently, In one such possibility, selection is made by keeping the crosshair over the same term or other item (by keeping the imager at the same approximate location relative to the machine-readable code) for some minimum amount of time, such as 2 seconds. Such a method has the advantage of requiring the user to physically do less, although it might require the user to be more attentive.

The method can also be used to set the position of sliders or other widgets indicating a point in a range of values, by altering the relative position of the machine readable code. It can be used to scroll, if movement is made to vary as position of the machine readable code is moved up or down or side to side with respect to the device. In addition, accelerators can detect directional movement so as to alter the scroll position, or the slider position, or the crosshair position. Contributing to this as well might be directional information provided by pointing capabilities within the device, which might come from gyroscopic or compass based information.

The method then determines in step 616 whether the underlying application allows for further navigation and input. While most such applications would probably allow for and expect further navigation and input, there may be some applications where once the navigation and/or input have been used once, there is no more need for this method of navigation and input. For example, if an application uses the method of navigation and input just for purposes of asking the user whether they want to quit the application, once the user has used the method to indicate the user's desire to quit, there is no further need for the method. In this instance, the method will proceed to step 618, terminating the method. If, alternatively, the underlying application does allow for further navigation and input, the method will in essence establish a loop, where the steps 606 through 616 will be repeated until such time that the method is otherwise terminated. In effect then, the method will continuously search and attempt to acquire the machine-readable code, changing location, and displaying the location based on the (possibly) ever-changing location of the image of the machine-readable code in the sensor of the device's imager. And as part of this loop, the method will continue to take whatever action is called for, if any.

FIG. 5 represents the image contained within the sensor of a device's imager. That is, the sensor consists of thousands or millions of image pixels, and depending on what the imager "sees" an image will register within these image pixels with varying degrees of intensity. The composite of the pixel registrations will in essence be an image of whatever visibly appears in front of the sensor.

Importantly, these pixel registrations are digital and can therefore be used for other purposes, such as those described previously. In FIG. 5, what the imager "sees" is assumed to be one and only one machine-readable code. This one machine-readable code can appear in the imager's sensor in any one of thousands or millions of locations. FIG. 5 indicates 9 such possible alternative locations, locations 502, 504, 506, 508, 510, 512, 514, 516 and 518. For purposes of clarification, it should be understood that in the present description there will be one and only one machine-readable code within view of the sensor, and the location of that machine-readable could be any one (and only one) of the 9 alternative locations indicated in FIG. 5. The location that the underlying application utilizes (e.g., in step 610 described above) is dependent on where the image of the machine-readable code appears within the imager's sensor. Thus, if the image of that code is at location 502, the application will use that location, the upper left, as the pointer for whatever purpose the application will make of that location information. In the search method of the present invention, if the image of the machine-readable code is at location 502, the search method will display a crosshair on top of the display component or component item in the upper left of the display. And, it is this location that could then be used for further purposes, such as selection of such display component or component item. If, alternatively, the image of the machine-readable code appears at location 516, the search method will display a crosshair on top of the display component or component item at the bottom center of the display. In a similar fashion, if the image of the machine-readable code appears in the imager's sensor at location 510, the search method application will place a crosshair on top of the component or component item in the center (both vertically and horizontally) of the display and use that location for purposes of any further action, such as selection of that display component or component item for search purposes. In a like way, the image of the machine-readable code could appear in any one of thousands or millions of different locations, including the 9 illustrated in FIG. 5, and the search method application would use that location for purposes of placing the crosshair and for the possible further use of user selection of the display component or component item underneath.

The method of navigation and input described above is illustrated by reference to FIG. 7. FIG. 7 starts with the same display produced from a machine-readable code as illustrated in FIG. 2. And, the illustration has as its objective the selection of the search terms as previously illustrated by reference to FIG. 3.

The user of an appropriate device is presented with a display as presented in FIG. 2 consistent with methods of the invention previously disclosed, such as that display being derived from a machine-readable code as also previously disclosed. It should be understood that the display need not be generated from a machine-readable code either directly or indirectly through a pointer provided in a machine-readable code. The method of navigation and input can benefit most any application requiring navigation and input, especially on mobile devices, regardless of how that application is placed on and activated by a computerized device.

The user would place the device's imager over the machine-readable code again and press the "*" key of component 403 (i.e., the "*" key on the phone's keypad). Pressing this key activates the present method of navigation and input. Assuming that the user has placed the device's imager within view of the machine-readable code, the method will respond by placing a crosshair within the display at such location as corresponds to the location of the image of the machine-readable code within the sensor of the device's imager. As is of course critical to the current application, the user can vary the location of the code's image in the sensor by moving the device. In this manner the user would move the device relative to the code (it is assumed for purposes of this description that the code remains stationary while the device moves although, of course, this need not be the case—the code could move while the device and/or imager remains stationary, or both code and device could move). As a result, the user would observe that the crosshair moves within the display in such manner as is within the control of the user.

The user would move the device imager such that the crosshair is at position 702, on top of the word 'Killer' (as previously discussed, while '"Killer' is highlighted—i.e., including the quote mark—by default it is assumed that the quote mark will be ignored for purposes of determining the search term). The user would then quickly move the device's imager toward the machine-readable code, thus selecting that word. The word 'Killer', would as a result be highlighted. In a similar fashion (while still pressing the "*" key of component 403), the user would move the device imager until the crosshair is at location 704, on top of the word, 'CPAs'. The user would select this word by again quickly moving the device imager toward the code. In a similar fashion, the user would place the crosshair at location 706, the location of the word, 'DVD'. The user would quickly move the device's imager toward the machine-readable code, thus selecting that word, with a resulting highlighting of that word. The user would then move the device's imager relative to the machine-readable code such that the crosshair is at location 708, on top of the search button icon. The user would, a final time, quickly move the device imager toward the machine-readable code, thus selecting the search function. This action would activate the search based on the search terms selected, i.e., 'Killer', 'CPAs' and 'DVD'. Because the method of navigation and input is no longer needed, that method would terminate. Of course, in other embodiments, the method could continue, awaiting further use. The net result is that the search is accomplished entirely by the present method of navigation and input, not requiring key pressing (other than pressing the "*" key of component 403 to activate the method of navigation and input which such pressing of a key would not be necessary in other embodiments—in one embodiment, the "*" key need be pressed just once at the beginning to activate the method of navigation and input and that method would continue until terminated, such as could occur where following the selection of search terms, a search is requested based on those terms, while in another embodiment, the method of navigation and input would start automatically, as previously described, and would continue until terminated).

Other uses of Method of Navigation and Input

While the method of navigation and input has been described by reference to the method of search of the present invention, the method of navigation and input can be well used for other purposes. The possible uses are numerous, some of which are described below.

Certainly, the method of navigation and input can be used to good effect in games. For example, a game of cars racing around a track, or a game of skiers skiing down a hill would enjoy the benefits of the method of navigation and input. In both instances, the user could use the method to direct a racecar or skier from side to side or to accelerate or decelerate by moving the device's imager such that the machine-readable code is toward the left, right, top and bottom, respectively, of the device imager's sensor. The further the machine-readable code is from the center of the sensor of the device's imager, the greater the relevant effect—e.g., the greatest acceleration can be activated by placing the image of the machine-readable code in the uppermost part of the sensor of the device's imager.

Or, moving the imager away from the code would cause deceleration while moving the imager closer could cause acceleration.

The method can prove quite useful for purposes of viewing maps, particularly on a mobile device. As previously described, a machine-readable code (e.g., placed on a map) could produce a map on the display of the device, either by directly encoding that map (or sufficient data from which the map can be produced without accessing data from a source other than the code or device) or by providing sufficient instruction from which the device could access data from a remote site, as from a .mobi site on the Internet. On a mobile device, that map display would typically need to be significantly smaller than would be possible on a computer screen or a printed page. This factor places an increased emphasis on the ability to move the map display such that adjoining map areas (i.e., areas of a map adjoining the area of the map presently displayed) can be displayed. For example, while a PC might be able to display downtown Lexington, Mass. and adjoining areas all on one display, a map displayed on a mobile device at comparable levels of detail might be able to show only the heart of downtown Lexington. If a user wishes to view adjoining areas, this raises an issue of how such viewing might be enabled. The method of navigation and input provides a solution. By moving the device imager in the desired direction, the user would produce a signal that would be sent to the mapping function (either onboard or remote) to recenter the map to another location where such location is directed by the method of navigation and input. If for example, the user wanted to view an adjoining area to the Northeast of the area of downtown Lexington currently displayed, the user would move the device such that the image of the machine-readable code would be in the upper right of the sensor of the device's imager. By moving the imager toward or away from the, code, the user could send a signal to the mapping function (either onboard or remotely) to zoom in or zoom out, respectively, from the present display.

In a similar fashion, the method of navigation and input could be useful for purposes of viewing large webpages or other pages. As discussed, the displays on mobile devices are often smaller than on a personal computer display and yet, the mobile device is often called on to display pages designed for a personal computer. This leaves open the issue of how the user can view the entire page, how the user can view other parts of the page. The present method of navigation and input provides a solution. As the user moves the device imager relative to the machine-readable code, and the image of the machine-readable code changes location in the sensor of the imager, this change of location could send a signal to change the part of a page that is displayed. Thus, for example, if the user moves the device such that the image of the machine-readable code is in the lower right portion of the imager's sensor, the signal produced would be to shift the portion of the page displayed to the lower right portion of such page. Also, by moving the imager toward or away from the machine-readable code, the user could send a signal to zoom in or zoom out, respectively, from the present display. This method of navigation around the page could prove much more intuitive than current methods used.

In those applications in which a map or webpage is being displayed and the method of navigation and input is being used to change the part of the overall map or webpage to display, such as described above, an issue arises as to what will be displayed and/or treated as the page centerpoint once the method has changed the page portion being displayed. While the preferred embodiment allows the application developer to design as deemed preferable, the typical choice would be to recenter in the new display for purposes both of making that the new center for display purposes and for purposes of further action such as again changing the portion of the map or webpage to display. In another instances, the developer may want the application to the original display and/or center, or may want to give the user of the device the ability to choose, such as might accomplished by, e.g., making recentering the default while allowing the user to snap back by pressing a key.

The method could assist in enabling electronic commerce and mobile commerce. For example, a person might wish to purchase tickets to a New York Yankees home game. The team could establish a website that functions as here described. First, a machine-readable code could be produced (by, e.g., the team) where by capturing and decoding that code, the user would be presented with a display that includes a seating chart (map) of Yankee Stadium (the details of this display could be either included in the machine-readable code itself or downloaded upon the capture and decoding of the machine-readable code as per instructions provided in the code). When the user moves the device's imager relative to the machine-readable code, a crosshair could also move across the seating plan with a further result that as the crosshair moves across a particular seating section, the display would also indicate what seating section the crosshair is located on, the prices of tickets for that section, and an indication of whether tickets are available for that seating section for that game. When the user reaches a desired seating section, typically based at least in part on the pricing and availability of tickets, the user could quickly move the device's imager closer to the machine-readable code, thereby signaling a desire to purchase tickets in that seating section. The device could then display a screen where the user is requested to indicate the number of tickets desired for purchase. One such manner in which this is displayed is that the display will have the numbers 1 2 3 4 5 6, etc. as icons (perhaps two or more such series of icons, one for adult tickets and one for children or other special prices, as would be consistent with the team's pricing policy) and a "Buy Now" icon so that by selecting the number, e.g., by causing the crosshair to appear over the appropriate number and then quickly moving the device's imager closer to the machine-readable code, and by selecting the "Buy Now" icon in a similar fashion, the purchase could be consummated, with the tickets made available at the Will Call window, by printing, by mailing of the tickets, by storing the ticket on the device itself (further discussed below) or by any other means consistent with current practices. The identity of the user could be known by the vendor based on prior arrangements between the two and based on the placement of cookies or other such data, as is common in current practice. The method of delivery could be consistent with a default method previously selected by the user (and, presumably stored as a cookie or as data in the vendor's database) or the device could as part of the display of the purchase screen present further icons for the method of delivery, with one to be selected by the user in a manner consistent with the other selections previously described. The method of payment could also be made consistent with a default method previously indicated by the user, as is consistent with current practices, or by further display by the device. In the instance where the delivery and payment methods are consistent with the default data, the use of the method of navigation and input could in essence result in a "no-click" purchase capability.

Returning to the example previously provided regarding the purchase of tickets to a New York Yankees game, the invention allows a further manner of delivering to the user a "ticket". That method involves transmitting back to the device a machine-readable code (presumably together with human-readable information indicating the salient details of the ticket) that represents the right to admission to the event. When the user arrives at the stadium, the user would present the device's display which such display would contain the machine-readable code. A scanner at the stadium would then image that machine-readable code and consistent with current practices (e.g., if no other person has been admitted to those seats, typically by displaying a ticket with identical or comparable machine-readable code) allow the person to enter.

The invention further allows for the acquisition of goods or services without connectivity, either immediate or in some instances, ever. This might be particularly called for where the device can store value, or where the value can be later charged to the user (as in, for example, the use of a cell phone where the charge could be added to the carrier's bill to the user, or where the user has made arrangements with, for example, a credit card company to allow value which would be later charged to the user) or where the good or service can be acquired without charge (including, for example, coupons), or in a variation on the theme, where the user's device communicates with another device that has connectivity. The invention allows for this acquisition of goods or services by communicating with another device that is capable of both displaying a machine-readable code and of dispensing (physically or by digital representation) the good or service. For example, a soda vending machine might be capable of displaying a machine-readable code on, for example, a LCD screen. This machine-readable code could contain the data needed to create a display on another device (e.g., the user's device) which provides a list of products available. By having the user's device image and decode that machine-readable code and as a result display a list of products available, using the present method of navigation and input (e.g., by placing the crosshair over the desired product and then quickly moving the device imager toward the machine-readable code), the user could select the desired product and then select to purchase such product, or both steps could be selected simultaneously. The user's device could as a result display another machine-readable code containing payment information which would then be imaged by the vending machine's imager. The vending machine would then decode the machine-readable code and, with or without connecting to a database to determine the validity of the payment information, authorize (or not authorize if there is an issue with the payment information presented) the payment made and dispense the product.

A yet further application which could enjoy the benefits of the method of navigation and input involves using a device to display and then select from television listings. A periodical or newspaper, or a television or computer might contain and display a machine-readable code that contains data on television shows (e.g., a listing of shows, times and channels). By imaging that code, a device user could then be presented with a display of such shows and corresponding data. By placing the crosshair, consistent with steps previously described, over a desired show, the user could then select such show consistent with steps previously described such as quickly moving the imager toward the machine-readable code. In selecting the show, the device could produce a signal used to produce further results. For example, by selecting a show, the device could transmit a signal to the user's personal video recorder (e.g., a DVR) to record that show. This signal could be to a nearby device, such as through the transmission of an infrared signal, or to a remote device as through a cell phone transmission to a server which would then send the appropriate signal to the person's PVR (see, e.g., www.gist.com for such signaling technology). Or, by selecting the show, the device could produce a signal to a nearby television or related device (e.g., through an infrared signal) to switch to the appropriate channel. Or, by selecting the show, the device could produce a signal requesting more information about the show which could then be transmitted back (if the information does not already reside on the device as might occur through, e.g., weekly downloads) and displayed on the device. Or by selecting the show, the device could produce a signal directing a transmission of the show to the device itself, as might be combined with the request to pay for such transmission pursuant to prearranged means if appropriate. Of course any combination of such signals is also possible, and further icons or pages could be displayed giving the user the ability to select what action to take with the selected show, where such selection could again be done consistent with the steps so described.

Another application could be for use with product information as might be found on the product itself or the product's packaging. For example, a bottle of prescription drugs could have a machine-readable code printed on it where that code contains a series of warnings as well as a list of further actions available to the user. By imaging the code, the user's device would possess the data needed to produce a display. That display could contain, for example, a listing of warnings for that drug, as might be presented currently with paper inserts that are sometimes distributed with prescription drugs. The display could also contain a list of further available actions such as a list of side effects together with an indication of the frequency of such effects, a telephone number and/or URL to request further information, an analysis of the pharmacology of the drug, etc. By selecting, for example, the telephone number, using the steps previously described, the user could cause the device (such as a camera phone) to call that number. The other actions, including those calling for additional information, could likewise be invoked.

Such techniques could be used for other products as well. For example, consumers often lose owner's manuals for purchased products. If the product itself has a machine-readable code on it, that code could contain some information about the product (e.g., basic instructions for basic operating techniques) as well as a listing of further possible actions, such as access to the full owner's manual, typically by download, an indication of specifications and/or replacement parts, some or all of which might be contained within the machine-readable code itself, or in the device, or through remote access, a telephone number for customer support, or instructions to be provided to the product itself—e.g. turn on the oven for 30 minutes at 400 degrees. The product could receive these instructions through many means, such as infrared signal, radio signal, or the means previously described by reference to the soda vending machine example, as well as any other means known to the art. The selection of the desired action could again be done by the method of navigation and input described.

Other Embodiments of the Invention

While the discussion above describes basic aspects of the inventions search function, the invention should be understood to include other aspects and functionalities.

While the description above provides the recipient with a list of links from which the recipient may then choose, steps 120 through 124, the person wishing to provide digital data may desire to provide another approach. In one such approach, the person providing digital data may want only one web page or other file to be returned to the recipient based on the search request. This one page or file may be, for example, a web page pertaining to a particular product of the person providing digital data, and that person may not desire the recipient to have a choice. The invention would allow for this possibility. The invention would also allow for the possibility that one file would be returned (and acted on by the device) by default but that the recipient could then request a search based on the original items displayed or based on the file sent back by default.

While the description above provides that the recipient may conduct a search based on selected words or other items, in some instances the person providing digital data may determine a priori that the entirety of the displayed items or displayed text will be used as the basis of the search. In one such example, if a magazine contains an advertisement for a new album, a machine-readable code might contain a 30-second snippet of a song from that album for the purpose of enticing the reader to buy that al. That snippet could itself be sent off to a database and compared to other snippets in the database, presumably producing as a search result that very song and the reader would then be prompted to purchase the song or the album.

Alternatively, the entirety of the displayed items or just the displayed text may by default be used as the basis of the search but that default may be overcome by the recipient if the recipient so desires. In one such instance where the entirety of the displayed items is used as the basis of search, the top listing produced (or the only listing as might be so directed or directed by default by the person providing digital data) might be of a web page that replicates the human-understandable contents of the machine-readable code but also provides additional information. In this way, the recipient could capture for immediate reading (or other use) the basics and then request greater details. For example, a machine-readable code might have encoded within it a brief review of a movie. By requesting a search of that review, the recipient might get that same review together with a listing of local theatres showing the movie, the times of showing, a trailer for the movie, etc.

In those instances where the person wishing to provide digital data wishes to provide significant amounts of such data, as might be the case, depending on the device's imager and other constraints, with an article, an audio clip, or a video clip, etc., the invention allows the person wishing to provide digital data to create a series of machine-readable codes such that the recipient could decode that series of machine readable codes to produce the entire digital content intended to be conveyed. The data from each machine-readable code could then be concatenated by the invention to produce the entire content intended to be displayed. Of course, each machine-readable code (or some combination thereof) could create individual files when reconstructed by the invention. In the instance where a person wishes to convey an article digitally as well as printed, that person could, for example, provide a machine-readable code for each paragraph such that the recipient could image and decode a particular paragraph in order to conduct a search based on terms in that paragraph and/or image and decode all paragraphs in order to capture the entire article. That "article" might include the individual paragraphs of text, each which might be encoded in a separate machine-readable code, as well as other materials (or pointers to materials) also encoded in the same or separate machine-readable codes, such as pictures, audio, video, advertisements, electronic spreadsheets or other digital data. Each of these separate components could be used as search terms as discussed above.

Of course, once the recipient has captured a paragraph, an article, audio or other component, the recipient could be presented with additional options of what to do with that captured information. In the instance where the device is a camera phone, it would be a natural extension to allow the user to transmit the captured component or components to another person. Thus, the common practice of emailing an article from the Internet to a colleague or friend could be extended to articles, or parts thereof, printed in newspapers, other periodicals, marketing collateral, etc., thereby overcoming an existing limitation of printed materials and significantly increasing the value of those articles, etc. Other common practices, such as storage of the materials, storage for later download to another device (e.g., from a camera phone to a PC), printing of the materials, ripping an audio to a CD, transferring a video (as might be either from the machine-readable code or from a source directed to by the machine-readable code or by a search enabled by the machine-readable code as disclosed above) to a display such as might be found on a PC or a television, could likewise be enabled by the invention.

The ability to use all or parts of text or recipient selected words from text (of, e.g., a paragraph) as the basis for search could prove important, especially in a publishing context. Current print publishing of periodicals and newspapers works largely on the premise that if meaningful content is provided, readers will read the publication and if readers read the publication, advertisers will pay to have their message displayed in the publication. But, having advertising targeted to the content of a particular article presents difficulties. First, it may be difficult to find the appropriate advertisers in the timeframe necessary for many if not most articles. And traditionally, finding the advertisers has been a manual process which itself presents limitations, such as cost, time constraints and workflow issues. Second, having related advertising displayed alongside an article may create credibility issues. Third, while it is difficult enough to target advertising based on the essence of an entire article, those difficulties would be multiplied in trying to target advertising to a particular paragraph, sentence, clause, URL or word. Fourth, traditional advertising in print publications is typically all or nothing—either you have your ad in all copies of the periodical (or at least major subsets) or none. The present invention can overcome these and other obstacles. With the present invention, the solicitation of advertising can be automated using techniques currently practiced with online advertising, especially those techniques used by search engines, including auctioning of keywords, automatic placing of orders (e.g., not requiring a person to accept the order or, for that matter, not requiring a person to place an order but instead have those orders placed by computers based on predetermined factors such as keywords and budgets), overcoming the problem of manually soliciting advertising. Because the advertising of the present invention is through a machine-readable code, and because that advertising would be largely or entirely through an automated system, the connection of the targeted advertising to the content of the article is less direct and less obvious, substantially minimizing credibility issues. Because the advertising is largely or entirely through a search that is conducted after the publication is published (although see discussion above regarding placing advertising in the machine-readable code), it is possible for the publication to sell the keywords to an almost unlimited number of different advertisers.

For example, if an article in a local newspaper (or part thereof discusses the advantages of adding a deck to your house, current print publication practices would require a contractor to place a print advertisement in all issues of the paper published. The current invention, however, would allow any number of contractors to buy a particular keyword and appear as the top choice in a listing of contractors—each such contractor could be the top listing for a limited number of the searches conducted. Consequently, a contractor could be included in the results a number of times that is consistent with the contractors budget. Each paragraph, sentence, phrase, URL or word could be the basis of a directed search and, consequently, the advertising could be much better targeted. As a result of all of these significant improvements, an entirely new source of advertising revenues could open up to publishers.

Publishers may further enhance their potential revenues by disclosing in advance (preferably as far in advance as possible) their upcoming articles to potential advertisers so that these advertisers can begin the bidding process for the search terms. It should be noted though that, unlike traditional print advertising models, bidding can continue even after the article has been published or even after the public has started to read the article due to the fact that searches will presumably continue based on the article (and its search terms therein) for some period of time following publication.

In the instance where an entire sentence or paragraph is used as the terms chosen for search, a possible issue arises—will that chosen set of words be so numerous that results produced would be largely meaningless? The present invention would employ methods that should significantly improve search results. One possible solution would allow the encoder of information to apply tag words to the selection. While the search should certainly become more focused by such a technique, there are inherent issues with such an approach. For one, the approach requires the encoder to expend extra effort. Also, the search results may be heavily slanted by the encoder's agenda. Another approach would track the search terms chosen by other readers of that passage and weight the search results toward those searches requested by the prior searchers. The essential concept at work here is that the prior searchers have already analyzed the passage for the most important search terms and the invention would preferably capture those prior thought processes. This approach would preferably require a signal be sent by the prior searchers that they have chosen terms from this passage. This could be accomplished by placing a unique identifier in the machine-readable code containing that passage so that every time a searcher requests a search based on such items (see discussion with reference to FIG. 1) that identifier would be sent along with the search items so that the passage can be identified. Alternatively, the entire passage could be sent along with the search items (which would have the advantage of not requiring registering the passage in advance). The approach of tracking prior searches would presumably require some minimum number of prior searches (the number of which could be derived from known statistical analyses) to produce meaningful results. Such an approach would therefore be especially useful where the passage was produced and read many times, as might be the case for a newspaper or other periodical. As a possible variation on the concept, search results would also be improved by tracking the links actually clicked through by prior users in addition to the search items chosen. Such click-throughs would influence the weighting of search results returned to a user whether that user requested a search based on particular search items or instead based on a longer passage. The weight assigned could be based on known statistical methods.

The invention would further allow for methods to capture the commercial value of the collective experiences of prior searchers. The invention would allow for a sale of these search terms or click-throughs (or data about the search terms or click-throughs which data could have separate commercial value), whether through an auction process or otherwise, both of which could be automatically performed without human intervention.

Also, the search terms used may well be based on the terms used in a previous search, either by the recipient or someone else. This would allow the machine-readable code to be either displayed on a desktop screen, or printed out, along with the search results. When that machine-readable code is captured, for example, by a mobile device (from the desktop screen or printout) then the same search, perhaps configured for the mobile space in various ways, can automatically be conducted from the mobile device. This would be very useful, for example, for printing out maps, directions, real estate listings and info, etc.

While the description thus far largely assumes that the search will occur on a server after the information is transmitted, this need not be the case. The search could in fact be done on the mobile device itself, or the mobile device could extract from the text the most relevant words to transmit. Thus, for example, the mobile device might redact common terms such as, "a, the, an, for, of" etc., with or without a further possibility of transmitting all or most words, but with a heavier weight assigned to the more unique words (e.g., proper names, as might be signified by upper-case letters except, perhaps, at the beginning of sentences, or web addresses). In the instance where a search is done on the mobile device itself, at least two possible approaches could be utilized. In one such possibility, the search is done by comparing the words of the text encoded in the machine-readable code (or the graphics, sounds, video, etc, encoded in the machine-readable code) with a database of such words (or other such components or component items) contained within the device itself. As more mobile devices contain hard drives (as some PDAs and cell phones do currently) or other substantial memory, these databases could be more commonplace, and as the capacity of these substantial memories increase, the databases could become larger. Another possible feature of these databases within the mobile devices is that preferential treatment could be given to those companies, etc. that pay to have themselves included in the database. It might be, for example, that the databases would be limited and the only way of being certain of being included is to pay. The results of the comparison of the text encoded in the machine-readable code with the database in the mobile device would be a list of possible web pages (or just the top one, depending on how the system is configured) that could then be transmitted such that the web pages could be sent back. Perhaps all or some such web pages would be requested by the mobile device and transmitted back, or preferably, the user would choose which webpage from the list to have sent back.

In addition, the search on a mobile device might be "personalized" by adding to the mix of considerations known or projected interests of the subscriber. These interests might be stored on the device itself, or retrieved from a server, and may be based on previous searches as well as on known demographic information about the subscriber. The algorithms employed to perform this "personalization" may include standard projection techniques based on standard statistical techniques, or the use of neural nets, as is known to those practicing in the field. The databases of relevance may include a large number of diverse types of information that could provide useful information about projected interests of the users. Beyond such things as previous searches, it might include the set of documents already downloaded on the device, the pictures, videos and audios downloaded or recorded along with the metadata they include, account info, contact information, saved web pages, bookmarks, history of phone calls and emails and messages. This may of course be added to by like data in other places, such as a PC or a server, which may be imported at times of synchronization.

Another approach involves a database on the mobile device with not just words and pointers to files, but also (or in lieu thereof) actual "web" pages or other files (e.g., pdf files, sound files, video files, graphics files, contact information such as a store's address, phone number, hours, etc.) that might or might not be currently accessed through the Internet—these pages might be similar to web pages but, since the pages would not be accessed over the Internet, as discussed below, they technically might not be considered web pages, but this distinction would preferably be transparent to the user. In this approach, when the user requests the mobile device to do a search based on the human-understandable information encoded in the machine-readable code, the mobile device could, consistent with techniques previously mentioned, compare words or other components (sounds, graphics, etc.) encoded in the machine-readable code with the mobile device's database of words or other components, producing file pointers and those file pointers could be to files located in a database on the mobile device itself, or a combination of from the mobile device and an external source, such as the Internet, or a hard drive or other memory source accessible by the mobile device through a WiFi, Bluetooth, hardwired or other connection. Alternatively, the mobile device could compare words or other components encoded in the machine-readable code with actual files in the database, skipping the step of comparing to components in a database of such components with matching file pointers. As the hard drives or other memories on mobile devices become larger, the databases of files could become larger. Based on current capacities, these databases could contain thousands or perhaps even millions of files. As another aspect of the mobile device databases, the files contained therein could be biased towards, or consist entirely or largely of, files from companies that pay for the privilege of having their files contained in the database—an approach that might be particularly helpful in the more immediate future where hard drive or other memory capacities will be more limited than as the years go by.

The search that is conducted might also be modeled on searches now used on desktops, which look at the entire contents of the document folder, and any related such documents—indeed the search may include all available info on all storage devices on the device.

With regard to the use of databases contained on the mobile device, a natural issue arises—how to install and update this database. One possible solution would be to install the database prior to the mobile device being sold. This might be particularly advantageous where the carriers could charge companies for the privilege of placing files in the phone's memory. Carriers currently offer substantial discounts on the purchase price of mobile phones. It could be a natural extension to base these discounts not only on the signing of a service contract but also for the placing of paid advertising content within the memories of phones—further techniques could be put in place to insure that users do not remove these advertiser-paid files from the phone's memory. The placement of the files on the phone could be largely or entirely transparent to the user—the phone may already contain the database when purchased by the consumer. This ability of carriers to charge for the placement of files on the phone's memory could reverse what might otherwise be a reluctance by the carriers to participate in the use of on-phone databases—without such additional revenue sources, the carriers may view the placement of a database of files on the phone as leading to decreases in the transmission of data to the phone which could decrease revenue from such transmissions. Another possibility for placing the file database on the phone is by the user him or herself. In a slight variation of this possibility, memory cards could be distributed that contain these databases where the memory cards are inserted into the device. The memory cards might also contain other data, such as a popular "album" and sold or given away largely on the basis of such album or other content (music videos, games, etc.) and where the database is also included. A further possibility is that the database is installed and/or updated as the phone is used—either when the user is actually engaged in a phone conversation, in which instance the data for the database piggybacks on the phone conversation, or when the user is transmitting other data to or from the phone, in which instance the database installation or update is, again, piggybacking on the user initiated data transmission, or perhaps whenever the phone is turned on data is transmitted. Some of these possibilities could benefit from a further feature in which the user's monthly service charge is reduced when these updates are allowed to be placed on the phone and/or when the user actually accesses particular advertisements or other files. Alternatively, the user might be given free songs, games, pictures, movies, music videos, television shows or ringtones when the database is installed or updated. These songs, ringtones, etc. might or might not be already within the phone's database, waiting to be released upon the user being granted a freebie or upon the user paying or agreeing to pay (e.g., through the monthly phone bill) for the file. Offering a free ringtone or song, etc. may be another way to encourage the user to update a database—when the user downloads the song, ringtone, etc, the data for the database update would piggyback on the transmission of the song, ringtone, etc.

There are other possibilities for transmitting the initial or updated data for the database on the phone. One such possibility involves transmitting the data through AM, FM, UHF, or VHF transmissions, or other spectrum transmissions aside from the cell phone transmissions themselves. These other transmissions could, for example, piggyback existing transmissions. The data could be updated through cradles used to simultaneously charge the phone and update data where the cradle receives the data from one of the sources previously indicated (WiFi, Bluetooth, FM, AM, TV, hardwire from a broadband connection, EVDO, etc.). A further advantage of the cradle approach is that the phone could in essence be used as a TiVo like device—the cradle could capture television programs and add them to the phone's database upon the phone synching with the cradle. Another possibility involves physically swapping hard drives or other memories in the phone—this might be advantageous where, for example, a supplier might offer cell phone users free or heavily discounted memory cards (or hard drives) for use on their cellphone where at least some part of these memories/hard drives are occupied by advertising for which the supplier received payment.

A further possibility for having this data placed in the phone's memory, albeit a less efficient method, is through the imaging and decoding of machine-readable codes. This method might be useful where the amounts of data are small. For example, an advertiser may want to encode in a machine-readable code the instructions to ignore some or all of that company's files previously placed in a database, possibly with pointers to new information files. This might be particularly called for where the files currently residing in the database are time-sensitive, as might be the case, for example, with rebate offers or other sales offers. Of course, these instructions to ignore files within a database could also be used to ignore files of a competitor, as might be the case where the advertiser pays for the privilege of having such instructions.

While the description to this point presumes that the database on the mobile device would be accessed as a result of instructions provided by imaging and decoding a machine-readable code (e.g., a machine-readable code), this, of course, need not be the case. The mobile device user could perform a search of the database based on the user's own input as might be provided by typing on the mobile device, by voice input, by imaging something from the real world (e.g., a company's logo or other brand) or otherwise.

The search method of the present invention could, consistent with current commercial practices, charge an advertiser when the recipient selects a link sponsored by that advertiser (see, for example, the AdWords program of Google, Inc., www.google.com). The links for which an advertiser would be charged could be contained within the page displayed where that page is contained within the machine-readable code. Or, the advertiser sponsored links could be contained within another page displayed on the device that is otherwise arrived at through the use of the search method of the present invention—e.g., the page returned as a result of a search requested by the recipient through the search method of the invention previously described. While the charge for these "click-throughs" would normally be charged while the recipient is online, this need not be the case. The invention allows for the storage of data on the selection of advertiser-sponsored links (i.e., for which a charge is to be imposed) such that that data can be communicated at some later time, such as when the device next goes online. This technique might be particularly called for when the device has an installed database. In these instances, the device may not need go online to retrieve the requested page or other file and yet, commercial practices might dictate that a charge be imposed on a sponsor for providing the recipient with such page or other file. Naturally, click histories of the recipient could be stored for later transmission even if sponsors are not to be charged. Or a combination of click history for sponsor-charging purposes and for other purposes could be stored and later transmitted.

The invention allows for search capabilities supplementary to those disclosed above. One such capability involves the use of the invention in the context of (geographical) maps. In one such instance, a website could be established (primarily intended to be accessed through the use of a personal computer, although a mobile device could also be used for some purposes depending on the circumstances) to provide maps and related functions, including such functions as are commonly available today such as providing a list of nearby businesses, landmarks, parks, etc. as well as directions from one location to another. In addition to these functionalities, the website would allow the user to capture particular information for purposes of possible later use. The website would allow the user to store such captured information on the computer, and/or on a mobile device and/or in the form of a machine-readable code. For example, if a user is planning a trip to Cambridge, Mass., that user might currently go to a website that would allow that user to produce a map of Cambridge (or the most relevant portions thereof together with directions on getting to a particular address in Cambridge. The user could also request businesses of a particular type (e.g., gas stations) within a certain distance. But once that map is printed out (as is often, if not typically done), the efforts that went into obtaining that map is largely lost. Using the invention, that same user could produce those same maps but also request that when the maps are printed (or stored as for later printing), the printouts would also contain one or more machine-readable codes, where those codes could be used as the basis for a later search, such as might be performed on a mobile device such as might be done when the user is in or on their way to their intended location, Cambridge. This code could contain, for example, the GPS coordinates at the center of the printed map. By using a mobile device such as a camera phone with Internet access, the user could image that machine-readable code and use the resulting data as the basis for a search (in whole or in part), where that search would presumably return as at least one option a map of Cambridge. Of course, the machine-readable code could, instead of performing a search, contain instructions to reproduce that same map or a largely comparable map modified to de displayed on a mobile device (e.g., by shrinking the area of coverage, by providing less detail, or by some combination of these possibilities). Having the map within the mobile device, the user could then perform other functions not possible with just the printed map—for example, search for gas stations, request directions to be conveyed by the device, move the map center to a location not within the printed map, implement a GPS device attached to the mobile device to determine the exact present location, etc. Thus, the user would not be required to reenter coordinates and/or addresses in order to re-perform the search on the mobile device.

Of course, the website could also allow the user to have further information placed into the machine-readable code, or alternatively, at a URL retrievable by such a code. If the user believes there is a good possibility of needing a gas station, a movie theatre, a bookstore, etc., the user could request that information, possibly together with an acceptable distance to travel to get to such location, to also be placed in the machine-readable code such that the user's mobile device would, upon imaging and decoding the code, display those search terms with or without the associated map, or the map information could be a further component for possible search, or the device could display a map with locations of chosen types of establishments marked on the map or some combination thereof. Where some or all of the data encoded into the machine-readable code is to be used as possible terms for a search, the methods described previously could be used by the user to select the terms desired at the time of the search. Or, the machine-readable code could contain sufficient information such that a search need not be conducted—e.g., the machine-readable code could contain a list of all gas stations within a certain distance together with addresses and phone numbers, such that the user could have their mobile device image and decode the code producing a list (or one) of gas stations and by selecting one, the user could initiate a call to that gas station.

Of course, such a website could allow the user to include more than one machine-readable code with the printout. One such code could contain the center coordinates of the printed map, another could contain the parameters (e.g., terms, and acceptable distances) for searching for a gas station, another could contain the parameters for searching for a bookstore, etc. The website could also provide a map with a machine-readable code for each of one or more landmarks, where those codes could be printed either within (e.g., at or near the location of such landmark in the map itself or alongside the map itself, or some combination thereof. The user could use these coordinates as, for example, a means of navigating to such particular landmark. For example, if a user is equipped with a mobile device that has both a camera and a GPS receiver, integrated or coupled, the invention would allow the user to have their mobile device image and decode the machine-readable code, and use the resulting coordinates as the desired location directing the GPS system (the "GoTo" location). In addition, directional or "pointing" information from the device itself could be employed to further enable precise instructions as to how to get to the sought for location. The map could in a similar fashion be printed with machine-readable codes indicating the existence of a photograph of a particular location (such as an intersection, street address or GPS coordinates), such that by imaging and decoding that machine-readable code, the user would be presented with a photograph of that location, thereby providing the user with visual cues of a location. These visual cues could be useful in orienting the user. And, of course, such codes could be further used by a GPS positioning system to direct the user to such location—directly if the code contains the coordinates, indirectly if the code contains a street address or intersection which would then be translated into coordinates. And, while the description thus far assumes that the user downloads these maps from a website based on the particular user preference, the invention could be used to good effect for pre-printed books, maps, flyers, etc. A travel guide to Boston, for example, could be preprinted with these machine-readable codes placed in the guide such that the uses previously described could be implemented.

These machine-readable codes could also be displayed on street signs, stores awnings or signs, plaques, billboards, outdoor displays (such as those capable of showing video or other moving objects) or otherwise in a physical location. These real world displays could be useful for orienting travelers, or for purposes of noting the location of a place of interest for later exploration, etc. The real world displays could also be used as a substitute for a GPS system. For example, when placed on a street sign, the machine-readable code could provide coordinates. If that sign is also facing a particular direction, and if that direction is also encoded into the machine-readable code, and if the user causes that code to be imaged straight on (i.e., the angle of the imager's sensor is parallel to the sign, assuming the angle of the captured image is not changed by the device), the device could show not only a map of the area and the present location on that map, but also the direction that the user is facing.

Of course, while the method of physical navigation disclosed above is described by reference to signs placed or viewable from outside locations, the method could be likewise useful in interior spaces. In an environment where an interior space is large, especially with many walls, hallways, shelves or other barriers, physical navigation can prove both problematic and beyond the reach of the GPS system. The dispersed placement of machine-readable codes containing location information, would allow a person to navigate to a particular point in that interior space. So, for example, if a visitor to an office building wanted to go to a particular office or conference room, that person might be given a machine-readable code with the location of that office by a receptionist or through means not requiring human intervention, such as through a kiosk—that kiosk could provide either a printout or simply a display (or both) of the machine-readable code to be imaged by the visitor's device. In a store environment, a kiosk could likewise be used as well as by placing these location machine-readable codes on sales flyers, etc. In an environment of an educational institution, the codes could be placed on registration or other course related materials or, again, made available through a kiosk. In a museum or tourist location the codes could be placed on printed guides of the location. And of course, all of these location machine-readable codes could be made available on the Internet, to be printed out for later imaging and/or images directly from the computer display. Whether through making visible on a medium (such as by printing), displaying through a computer or by otherwise making a machine-readable code available for imaging, that code should be understood as being presented for purposes of the method of navigation and input.

Navigation of both the exterior and interior spaces contemplates identifying for each location a set of data points corresponding to such location. In the instance of an exterior location, the set of data points could be longitude, latitude coordinates as well as, perhaps, elevation. In the instance of an interior location, longitude and latitude coordinates and elevation could likewise or the person designing the application for such space may choose a different system of identifying locations, such as office location. A different scheme of identifying an exterior location could likewise be adopted.

The system of physical navigation overcomes many problems inherent in using the GPS system. A person in need of navigation may not own such a receiver, or may use such a system just in a car, or may have chosen to not carry the receiver or may have simply forgotten it. Current practices would suggest a much greater likelihood of the average person carrying a camera phone on one's person at any particular point in time. Even if a person has a GPS receiver with them, GPS signals may be unavailable or sporadic, as will be the case in an interior environment or in an exterior environment with obstacles, such as buildings and trees, blocking the signals. Furthermore, the time to acquire a signal, where available, can also prove problematic. The method of physical navigation, used alone or in conjunction with the GPS system, can overcome these problems. One such embodiment encompasses a system which uses one system (either the GPS or the method of physical navigation) by default but switches to the other system where the default system is not providing signals but the other system is.

The functionality described above in the mapping context could give rise to many possible commercial applications. In an example of one such application, the user could, when directing the website to produce the appropriate map for printout, also direct that website to produce a machine-readable code for a particular bookstore (or bookstores) within a certain distance. That code could also contain further data which, when later imaged and decoded, would transmit to that bookstore a purchase order together with billing information (e.g., credit card information) for a particular book or other publication (or with further intermediary steps taken by the user on the mobile device, an order for one or more publications from among a list of publications where the user would select from a list displayed on the mobile device where that list was previously requested of the website by the user, as might be encoded into a machine-readable code). In this way, the user could then proceed to the bookstore and acquire the book on an expedited basis. When arriving at the bookstore, the user could acquire the book in traditional methods, such as showing traditional identification, or the mobile device could itself be used as identifying means, such as by displaying a machine-readable code indicating the purchasers name, credit card information, item purchased, etc, all of which could be encrypted for added security, where such techniques of the mobile device showing a machine-readable code to verify purchase are currently known and practiced. Such techniques could naturally be used for other commercial transactions such as movie tickets and restaurant reservations (e.g., the user has a list of 5 possible restaurants in which to eat a dinner for two, and by transmitting the request, the mobile device would transmit the reservation request to the restaurant.

In another use of the technology, the invention could allow the person wishing to provide digital data the ability to encode a list of available venues for upcoming entertainment events. For example, an advertisement for a movie might include a machine-readable code which, when decoded and acted upon by the recipient's device, would cause the device to display a list of local theatres and times when the movie is showing on the current day, together with a "buy tickets" icon which when selected would allow the recipient to buy one or more tickets for that show at that theatre. While the recipient may need to initially input a location (e.g., by city and state and/or zip code and/or telephone number, or by ascertaining the location based on the device's location, as is consistent with current practice), those locations could thereafter be stored (as cookies or in a manner similar to cookies) such that future lists displayed would be weighted toward these locations. If the movie advertisement were in affixed location, (e.g., on a sign or billboard), the machine-readable code could contain its location which could then be used to find local theatres, etc. The tickets purchased could be electronic, for later pickup, or stored as a barcode or barcodes, all consistent with current ticketing practices. Also consistent with current practices, credit card or other account information could be stored for future uses, either on the device or on the site that the person wishing to provide digital data directs or through a site that the person wishing to provide digital data allows as an option for payment. For example, a movie theatre may place a machine-readable code within an advertisement for movies currently showing at that theatre where the code contains a list of each showing for that day (or several days) and when the recipient clicks through the "buy tickets" icon, and selects the desired tickets, the recipient is then given the option to pay with credit card or by online wallet service, such as PayPal.

A further benefit afforded by the invention is the ability to buy an item (e.g., product or service) through a one-click service. In one such possibility, the recipient is presented with a list of possible products, or a list of possible vendors from which to purchase a product (or a combination thereof), a list which might be returned by search or that might be contained in the machine-readable code itself. A display provided by such search or within such machine-readable code could contain an icon to the effect of "Buy It". Upon the recipient selecting an item to buy as could be done using the methods described above consistent with selecting search terms, and upon the recipient selecting such icon, the item is automatically purchased by the device transmitting the item requested by the recipient together with an indication of the person making the request where that person's relevant information is known to the vendor, as is common practice today for Internet purchases. For example, a machine-readable code could contain a list of the top ten selling books (or CDs, etc.). Upon imaging and decoding that code, the recipient would be presented with that list of books together with a "Buy It" icon. The recipient would select the desired book (or books) and the "Buy It" button and the book would be automatically purchased and shipped using the billing and shipping information on record for that user with the vendor. Of course, the information displayed could contain both a list of books and a list of vendors (preferably together with an indication of prices) and by selecting the desired book (or books), and vendor, and the "Buy It" icon, the order would be processed by that vendor. Of course, there could be variations on this method. In one such variation, an order could be automatically placed following the device imaging and decoding a machine-readable code. Following a review of a new book, for example, the publication might have a machine-readable code with an indication, "to purchase now through XYZ, simply snap a picture of this barcode". And, of course, the decision to purchase in any one of these instances could be preceded by a warning message—e.g., "Are you sure that you want to purchase the book, "Amy Goes to School", and ship it to 123 Main Street, Anywhere, N.Y. and charge your account ending 1234?".

In another variation, as might be particularly useful in instances where the machine-readable code contains sufficient information from which to make a purchase without first seeking additional information from another source, the recipient makes a selection from the option or options contained in the machine-readable code and instead of the device immediately transmitting the request at the time of the selection (e.g., because an attempt to go online failed), the device stores the request and transmits the request at a later time, such as the first time the device is connected to an appropriate source (such as the Internet). Such a capability could be especially important in those instances where the device cannot access the appropriate source at the time of the request, as might often be the case where the device is a camera cell phone and there is a lack of service in a particular location. Such a technique might also be called for where the recipient is afforded (or chooses) a "cooling off period" to contemplate the purchase decision.

While the preferred embodiment provides for the decoding of the machine-readable code by the device performing the imaging, there may instances where the device does not allow for such possibility. For example, there may be devices, such as certain camera cell phones, in which the camera API is not disclosed or otherwise made legally available. These phones may nonetheless allow for the capture of images, the transmission of images captured, and the display of pages from the Internet. In these instances, the invention would allow the recipient to image the machine-readable code and transmit it to a server. This server would decode the image of the code and transmit back the components contained in that code such that the recipient has displayed (and otherwise performed and available) in much the same fashion as though the device did image and decode the machine-readable code.

The invention claimed is:

1. A method of navigation and input comprising:

imaging a mark whereby an image of that mark is captured by an imager sensor, determining at least part of the location of that image of the mark in the imager sensor, determining the number of image pixels in which that image of the mark is captured by the imager sensor, establishing a threshold of change in the number of image pixels in which that image of the mark is captured by the imager sensor, establishing a time frame threshold over which such change occurs, establishing whether the exceeding or the failure to exceed those thresholds is intended to indicate an action to be taken within the computerized application, tracking the number of image pixels in which that image of the mark is captured by the imager sensor, generating a signal to the application that an action should be taken based on the tracked number of image pixels in which the image of the mark is captured by the imager sensor exceeding or failing to exceed the thresholds established, and performing the action so signaled.

2. The method of navigation and input of claim 1 where the change is an increase in the number of image pixels in which an image of the mark is captured by the imager sensor over a time interval less than the time frame so established.

3. The method of navigation and input of claim 1 where the signal to the computerized application to take action is generated when the number of image pixels in which an image of the mark is captured by an imager sensor does not change more than an established threshold amount for at least the time frame threshold established.

4. The method of navigation and input of claim 1 where the action is selection.

5. The method of navigation and input of claim 1 where the application displays maps.

6. The method of navigation and input of claim 1 where the application displays web pages.

* * * * *